United States Patent
Lin

(10) Patent No.: US 12,418,921 B2
(45) Date of Patent: Sep. 16, 2025

(54) METHOD, USER EQUIPMENT, AND NON-TRANSITORY COMPUTER READABLE MEDIUM FOR PHYSICAL LAYER-BASED PRIORITIZATION WITHOUT LOGICAL CHANNEL-BASED PRIORITIZATION

(71) Applicant: Purplevine Innovation Company Limited, Hong Kong (CN)

(72) Inventor: Yi-Ting Lin, Hong Kong (CN)

(73) Assignee: Purplevine Innovation Company Limited, Hong Kong (CN)

( * ) Notice: Subject to any disclaimer, the term of this patent is extended or adjusted under 35 U.S.C. 154(b) by 616 days.

(21) Appl. No.: 17/796,278

(22) PCT Filed: Aug. 5, 2021

(86) PCT No.: PCT/CN2021/111044
§ 371 (c)(1),
(2) Date: Jul. 29, 2022

(87) PCT Pub. No.: WO2022/028553
PCT Pub. Date: Feb. 10, 2022

(65) Prior Publication Data
US 2023/0080469 A1   Mar. 16, 2023

Related U.S. Application Data

(60) Provisional application No. 63/062,179, filed on Aug. 6, 2020.

(51) Int. Cl.
*H04W 72/23* (2023.01)
*H04W 72/566* (2023.01)
(52) U.S. Cl.
CPC ......... *H04W 72/23* (2023.01); *H04W 72/569* (2023.01)

(58) Field of Classification Search
None
See application file for complete search history.

(56) References Cited

U.S. PATENT DOCUMENTS 12,052,662 B2 * 7/2024 Kung ................ H04W 72/0446
12,328,736 B2 * 6/2025 Alabbasi ............... H04W 72/23
(Continued)

FOREIGN PATENT DOCUMENTS

| CN | 111436068 | 7/2020 |
| WO | WO 2020/057335 | 3/2020 |

OTHER PUBLICATIONS

International Search Report and the Written Opinion Dated Nov. 4, 2021 From the International Searching Authority Re. Application No. PCT/CN2021/111044. (6 Pages).
(Continued)

*Primary Examiner* — Phirin Sam

(57) ABSTRACT

A method, a UE, and a non-transitory computer readable medium for PHI-based prioritization without LCH-based prioritization are provided. In an embodiment, the method includes when the LCH-based prioritization is not configured, and the PHY-based prioritization is configured in the UE, receiving, by a PHY layer of the UE, a first uplink grant and a second uplink grant that have an overlapping conflict in time domain, and have a first PHY priority and a second PHY priority, respectively; when uplink transmission for the uplink grants is not on-going, delivering, by the PHY layer, first information to a MAC layer of the UE, wherein the first information is for resolving the overlapping conflict by comparing the first PHY priority with the second PHY priority, and generating, by the MAC layer, only a first MAC protocol data unit for a first one of the uplink grants using the first information.

17 Claims, 12 Drawing Sheets

(56) References Cited

U.S. PATENT DOCUMENTS

| | | | |
|---|---|---|---|
| 2017/0302470 A1* | 10/2017 | Clark .................... | H04L 41/00 |
| 2021/0034818 A1* | 2/2021 | Hofmann ............... | H04W 4/20 |
| 2021/0212085 A1 | 7/2021 | Wu | |
| 2021/0400701 A1* | 12/2021 | Lu ........................ | H04W 72/21 |
| 2022/0159667 A1* | 5/2022 | Zhang ............... | H04W 72/0453 |
| 2022/0201751 A1* | 6/2022 | Loehr .................. | H04L 1/1822 |
| 2022/0256580 A1* | 8/2022 | Fu ........................ | H04W 72/02 |
| 2022/0338211 A1* | 10/2022 | Alabbasi ............ | H04W 72/569 |
| 2022/0386326 A1* | 12/2022 | Fu ........................ | H04W 72/23 |
| 2022/0400496 A1* | 12/2022 | Gerami .............. | H04W 72/569 |
| 2024/0188126 A1* | 6/2024 | Babaei ................ | H04W 16/04 |

OTHER PUBLICATIONS

Nokia et al., IIoT WI: Resource Conflicts Between UL Grants, HARQ-ACK and Activation/Release Aspects for SPS, 3GPP TSG RAN WG1 Meeting #99, Reno, Nevada, USA, Nov. 18-22, 2019, R1-191609, 10 P., Nov. 18, 2019. (10 pages).

Ericsson, On PHY and MAC Interaction to Support Intra-UE Prioritization, 3GPP TSG-RAN WG2 #109-e, Electronic Meeting, Feb. 24-Mar. 6, 2020, R2-20000795, Revision of R2-1914758, 6 P., Feb. 24, 2020. (6 pages).

* cited by examiner

1900

| PHY priority | LCH priority |
|---|---|
| 0000 | Level-1 |
| 0001 | Level-2 |
| 0010 | Level-3 |
| 0011 | Level-4 |
| 0100 | Level-5 |
| 0101 | Level-6 |
| 0110 | Level-7 |
| 0111 | Level-8 |
| 1000 | Level-9 |
| 1001 | Level-10 |
| 1010 | Level-11 |
| 1011 | Level-12 |
| 1100 | Level-13 |
| 1101 | Level-14 |
| 1110 | Level-15 |
| 1111 | Level-16 |

FIG. 19

METHOD, USER EQUIPMENT, AND NON-TRANSITORY COMPUTER READABLE MEDIUM FOR PHYSICAL LAYER-BASED PRIORITIZATION WITHOUT LOGICAL CHANNEL-BASED PRIORITIZATION

RELATED APPLICATIONS

This application is a National Phase of PCT Patent Application No. PCT/CN2021/111044 having International filing date of Aug. 5, 2021, which claims the benefit of priority under 35 USC § 119 (e) of U.S. Provisional Patent Application No. 63/062,179 filed on Aug. 6, 2020. The contents of the above applications are all incorporated by reference as if fully set forth herein in their entirety.

FIELD AND BACKGROUND OF THE INVENTION

The present disclosure relates to the field of wireless communication, and more particularly, to a method, a user equipment, and computer readable-storage medium for physical layer-based prioritization without logical channel-based prioritization.

One type of an intra-user equipment (UE) uplink resource conflict is an overlapping conflict in time domain between two uplink grants. The two uplink grants can be a dynamic grant (DG) and a configured grant (CG), a CG and another CG, and a DG and another DG. The overlapping conflict in time domain may be resolved by physical layer-based prioritization (PHY-based prioritization) or media access control (MAC) logical channel-based prioritization (LCH-based prioritization).

For the PHY-based prioritization, a radio access network (RAN) node, such as a next generation NodeB (gNB), configures a physical layer priority (PHY priority) of a DG using a priority index in downlink control information (DCI). The RAN node configures a PHY priority of a CG using a priority index signaled by radio resource control (RRC) signaling. The PHY priority of each of the two uplink grants (the DG and the CG) is 2-level. According to the PHY-based prioritization rules, (1) in a case that a CG with a high PHY priority collides with a DG with a low PHY priority, the CG is prioritized, and if uplink transmission of the DG is on-going, the uplink transmission of the DG is canceled; (2) in a case that a CG with a high PHY priority collides with another CG with a low PHY priority, the CG with the high PHY priority is prioritized, the high-PHY priority CG may interrupt the on-going low-PHY priority CG, and a timeline therefor is up to UE implementation; (3) in a case that a CG with a low PHY priority collides with a DG with a high PHY priority, the DG is prioritized, and if uplink transmission of the CG is on-going, the uplink transmission of the CG is canceled (considering timeline restrictions); (4) in a case that a CG collides with a DG of the same PHY priority, the DG is prioritized, and since for the CG and the DG of the same PHY priority, a 3rd Generation Partnership Project Release 15 (3GPP Rel. 15) cancellation timeline applies, uplink transmission of the CG does not start; (5) a case that a CG collides with another CG of the same PHY priority is not addressed by the PHY-based prioritization; (6) a case that a DG collides with another DG is not addressed by the PHY-based prioritization.

For the LCH-based prioritization, a comparison on a priority (such as the highest priority) of all LCH(s) between the two uplink grants is performed to select one of the two uplink grants for which one MAC protocol data unit (PDU) is generated. The LCH(s) are one or more LCHs that have data available and are multiplexed or can be multiplexed into each of the two uplink grants, taking into account logical channel prioritization (LCP) mapping restrictions.

The PHY-based prioritization and the LCH-based prioritization may complement each other in different situations.

SUMMARY OF THE INVENTION

For an existing method that uses physical layer-based prioritization (PHY-based prioritization) and media access control (MAC) logical channel-based prioritization (LCH-based prioritization) that complements each other in different situations to resolve an overlapping conflict in time domain between two uplink grants within a user equipment (UE), the UE needs to have both a capability of the PHY-based prioritization and a capability of the LCH-based prioritization. For industrial internet of things (IIoT) applications, it may be desirable that UEs are allowed to have versatile capabilities. Thus, the present disclosure proposes to enhance UE capability versatility by allowing a case that the PHY-based prioritization is configured and the LCH-based prioritization is not configured. Such configuration is also agreed upon in a RAN2#109bis-e meeting. When the existing method is modified in such a way that the LCH-based prioritization is not configured in situations that the LCH-based prioritization is originally used to resolve the overlapping conflict, two MAC protocol data units (PDUs) for the two uplink grants are generated, respectively, when uplink transmission for the uplink grants is not on-going, which can cause one of the MAC PDUs to be lost, one of the MAC PDUs needs to be retransmitted, or uplink transmission for one of the MAC PDUs needs to be cancelled. Thus, in the present disclosure, information for resolving the overlapping conflict by comparing the physical layer priorities (PHY priorities) of the two uplink grants, respectively, is delivered by the physical layer (PHY layer) to the MAC layer. In this way, only one MAC PDU is generated for one of the two uplink grants using the information.

In a first aspect of the present disclosure, a method performed by a UE includes: when MAC LCH-based prioritization is not configured, and PHY-based prioritization is configured in the UE, receiving, by a PHY layer of the UE, a first uplink grant and a second uplink grant that have an overlapping conflict in time domain, and have a first PHY priority and a second PHY priority, respectively; and when uplink transmission for the uplink grants is not on-going, delivering, by the PHY layer, first information to a MAC layer of the UE, wherein the first information is for resolving the overlapping conflict by comparing the first PHY priority with the second PHY priority, and generating, by the MAC layer, only a first MAC PDU for a first one of the uplink grants using the first information.

In a second aspect of the present disclosure, a UE includes: at least one processor configured to execute instructions to implement the method of the first aspect of the present disclosure.

In a third aspect of the present disclosure, a non-transitory computer readable medium has instructions stored therein, wherein the method of the first aspect of the present disclosure is implemented when the instructions are executed.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 19 is a schematic table diagram illustrating a PHY priority-to-LCH priority mapping 1900, wherein the mapping is one-to-one, in accordance with some embodiments of the present disclosure.

DESCRIPTION OF SPECIFIC EMBODIMENTS
OF THE INVENTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, and does not limit the disclosure.

As used here, when at least one operation is referred to as being performed "using", "from", "on", or "on the basis of" at least one object, the at least one operation is performed "directly using", "directly from", "directly on", or "directly on the basis of" the least one object, or at least one intervening operation can be present. In contrast, when the at least one operation is referred to as being performed "directly using", "directly from", "directly on", or "directly on the basis of" the least one object, no intervening operation present.

A combination such as "at least one of A, B, or C," "one or more of A, B, or C," "at least one of A, B, and C," "one or more of A, B, and C," or "A, B, and/or C" may be A only, B only, C only, A and B, A and C, B and C, or A and B and C, where any combination may contain one or more members of A, B, or C.

For an existing method that uses physical layer-based prioritization (PHY-based prioritization) and media access control (MAC) logical channel-based prioritization (LCH-based prioritization) that complements each other in different situations to resolve an overlapping conflict in time domain between two uplink grants within a user equipment (UE), the UE needs to have both a capability of the PHY-based prioritization and a capability of the LCH-based prioritization. For industrial internet of things (IIoT) applications, it may be desirable that UEs are allowed to have versatile capabilities. Thus, the present disclosure proposes to enhance UE capability versatility by allowing a case that the PHY-based prioritization is configured and the LCH-based prioritization is not configured. Such configuration is also agreed upon in a RAN2#109bis-e meeting. When the existing method is modified in such a way that the LCH-based prioritization is not configured in situations that the LCH-based prioritization is originally used to resolve the overlapping conflict, two MAC protocol data units (PDUs) for the two uplink grants are generated, respectively, when uplink transmission for the uplink grants is not on-going, which can cause one of the MAC PDUs to be lost, one of the MAC PDUs needs to be retransmitted, or uplink transmission for one of the MAC PDUs needs to be cancelled.

Figure 1:
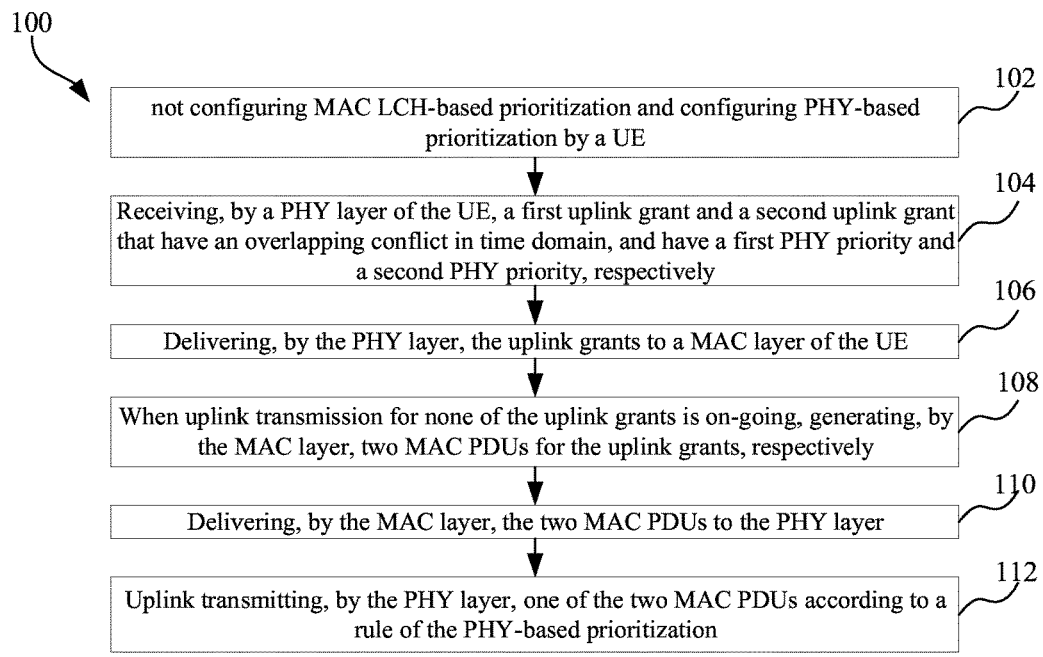
FIG. 1 is a flowchart illustrating an existing method that is modified in such a way that media access control (MAC) logical channel-based prioritization (LCH-based prioritization) is not configured in situations that the MAC LCH-based prioritization is originally used to resolve an overlapping conflict.
Figure 2:
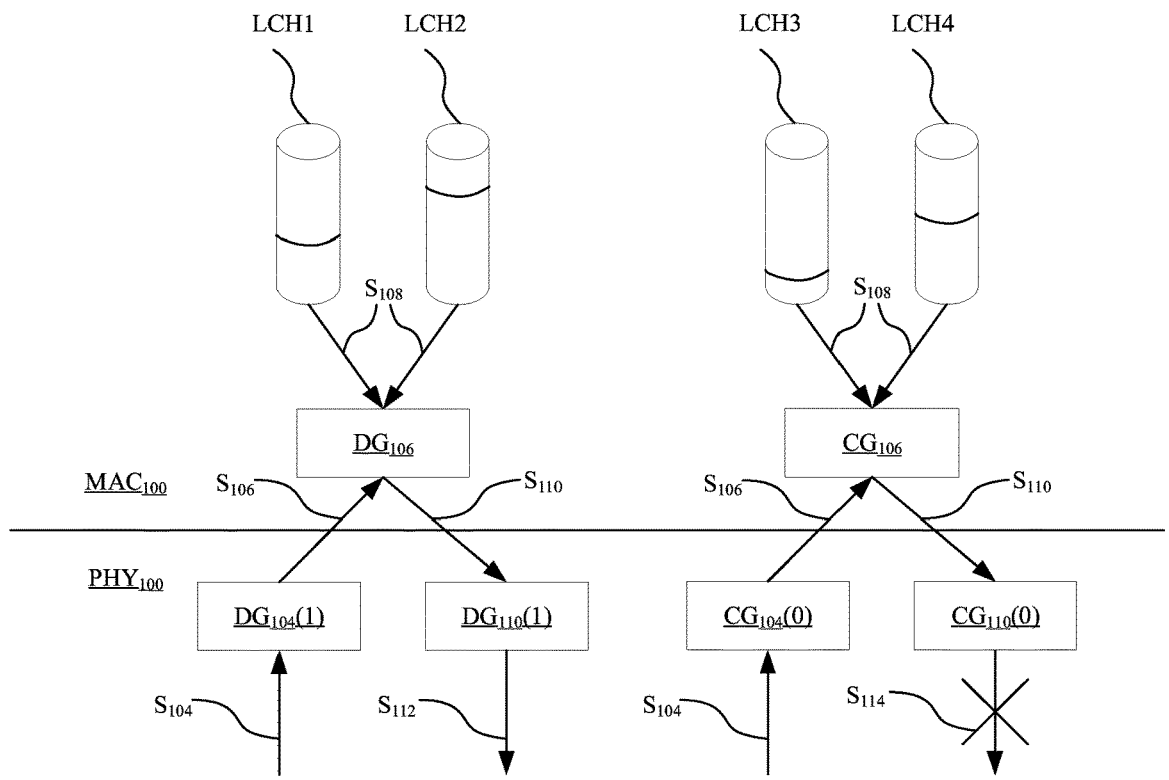
FIG. 2 is a schematic diagram illustrating an example of a MAC protocol data unit (PDU) loss resulting from applying the modified existing method to an overlapping conflict in time domain between a dynamic grant (DG) with a high PHY priority and a configured grant (CG) with a low PHY priority.

Referring to FIGS. 1 and 2, FIG. 1 is a flowchart illustrating the existing method 100 that is modified in such a way that the MAC LCH-based prioritization is not configured in situations that the MAC LCH-based prioritization is originally used to resolve the overlapping conflict. FIG. 2 is a schematic diagram illustrating an example of a MAC PDU loss resulting from applying the modified existing method to an overlapping conflict in time domain between a dynamic grant (DG) with a high PHY priority and a configured grant (CG) with a low PHY priority. The modified existing method 100 includes the following steps.

In step 102, MAC LCH-based prioritization is not configured and PHY-based prioritization is configured by a UE. When the LCH-based prioritization is not configured by the UE, the LCH-based prioritization is not performed. For the LCH-based prioritization, a comparison on a priority (such as the highest priority) of all logical channel(s) (LCH(s)) between the two uplink grants is performed to select one of the two uplink grants for which one MAC PDU is generated. The LCH(s) are one or more LCHs that have data available and are multiplexed or can be multiplexed into each of the two uplink grants, taking into account logical channel prioritization (LCP) mapping restrictions. When the PHY-based prioritization is configured by the UE, the PHY-based prioritization may be performed. For the PHY-based prioritization, a radio access network (RAN) node, such as a next generation NodeB (gNB), configures a physical layer priority (PHY priority) of a DG using a priority index in downlink control information (DCI). The RAN node configures a PHY priority of a CG using a priority index signaled by radio resource control (RRC) signaling. The PHY priority of each of the two uplink grants (the DG and the CG) is 2-level. The PHY priority is high when the priority index is 1 and is low when the priority index is 0. According to the PHY-based prioritization rules, (1) in a case that a CG with a high PHY priority collides with a DG with a low PHY priority, the CG is prioritized, and if uplink transmission of the DG is on-going, the uplink transmission of the DG is canceled; (2) in a case that a CG with a high PHY priority collides with another CG with a low PHY priority, the CG with the high PHY priority is prioritized, the high-PHY priority CG may interrupt the on-going low-PHY priority CG, and a timeline therefor is up to UE implementation; (3) in a case that a CG with a low PHY priority collides with a DG with a high PHY priority, the DG is prioritized, and if uplink transmission of the CG is on-going, the uplink transmission of the CG is canceled (considering timeline restrictions); (4) in a case that a CG collides with a DG of the same PHY priority, the DG is prioritized, and since for the CG and the DG of the same PHY priority, a 3rd Generation Partnership Project Release 15 (3GPP Rel. 15) cancellation timeline applies, uplink transmission of the CG does not start; (5) a case that a CG collides with another CG of the same PHY priority is not addressed by the PHY-based prioritization; (6) a case that a DG collides with another DG is not addressed by the PHY-based prioritization.

In step 104, a first uplink grant and a second uplink grant that have an overlapping conflict in time domain, and have a first PHY priority and a second PHY priority, respectively, is received by a PHY layer of the UE. Illustratively, in the example in FIG. 2, the first uplink grant is a DG with a high PHY priority $DG_{104}(1)$ (i.e., with a priority index of 1 for the first PHY priority). The second uplink grant is a CG with a low PHY priority $CG_{104}(0)$ (i.e., with a priority index of 0 for the second PHY priority). The DG $DG_{104}(1)$ and the CG $CG_{104}(0)$ have an overlapping conflict in time domain, i.e., a physical uplink shared channel (PUSCH) duration of the DG $DG_{104}(1)$ overlaps a PUSCH duration of the CG $CG_{104}(0)$. In step 104, a PHY layer $PHY_{100}$ of the UE performs a step $S_{104}$ of receiving the DG $DG_{104}(1)$ and the CG $CG_{104}(0)$.

In step 106, the uplink grants are delivered by the PHY layer to a MAC layer of the UE. In the example in FIG. 2, in step 106, the PHY layer $PHY_{100}$ performs a step $S_{106}$ of delivering the DG without the first PHY priority $DG_{106}$ and the CG without the second PHY priority $CG_{106}$ to a MAC layer $MAC_{100}$ of the UE. The DG $DG_{106}$ has the same content as the DG $DG_{104}(1)$ except the DG $DG_{106}$ does not have information of the first PHY priority. The CG $CG_{106}$ has the same content as the CG $CG_{104}(0)$ except the CG $CG_{106}$ does not have information of the second PHY priority.

In step 108, when uplink transmission for the uplink grants is not on-going, two MAC PDUs for the uplink grants, respectively, are generated by the MAC layer. In the example in FIG. 2, in step 108, when uplink transmission for the uplink grants (the DG $DG_{106}$ and the CG $CG_{106}$) is not on-going, the MAC layer $MAC_{100}$ performs a step $S_{108}$ of encapsulating, on the basis of LCP mapping restrictions, data from an LCH LCH1 and an LCH LCH2 into a first MAC PDU for the DG $DG_{106}$ and data from an LCH LCH3 and an LCH LCH4 into a second MAC PDU for the CG $CG_{106}$. Thus, because the LCH-based prioritization is not configured in step 102, two MAC PDUs (i.e., the first MAC PDU and the second MAC PDU) for the uplink grants (i.e., the DG $DG_{106}$ and the CG $CG_{106}$), respectively, are generated by the MAC layer $MAC_{100}$. The LCP mapping restrictions for each LCH LCH1, . . . , or LCH4 is configured using parameters including allowedSCS-List, maxPUSCH-Duration, configuredGrantType1Allowed, and allowedServingCells. For example, configuredGrantType1Allowed of each of the LCHs LCH3 and LCH4 is enabled. Thus, the data from LCH3 and LCH4 can be encapsulated into the second MAC PDU for the CG $CG_{106}$. The data from LCH LCH3 and LCH LCH4 may alternatively be encapsulated into the first MAC PDU for the DG $DG_{106}$ when maxPUSCH-Duration is satisfied. On the other hand, configuredGrantType1Allowed of each of the LCHs LCH1 and LCH2 is disabled. Thus, the data from LCH1 and LCH2 can only be encapsulated into the first MAC PDU for the DG $DG_{106}$.

In step 110, the two MAC PDUs are delivered by the MAC layer to the PHY layer. In the example in FIG. 2, in step 110, the MAC layer $MAC_{100}$ performs a step $S_{110}$ of delivering the first MAC PDU for the DG $DG_{106}$ and the second MAC PDU for the CG $CG_{106}$ to the PHY layer $PHY_{100}$. The DG $DG_{106}$ of which the first MAC PDU is received by the PHY layer $PHY_{100}$ along with the corresponding PHY priority of the DG $DG_{106}$ known by the PHY layer $PHY_{100}$ is denoted as $DG_{110}(1)$. The CG $CG_{106}$ of which the second MAC PDU is received by the PHY layer $PHY_{100}$ along with the corresponding PHY priority of the CG $CG_{106}$ known by the PHY layer $PHY_{100}$ is denoted as $CG_{110}(0)$.

In step 112, one of the two MAC PDUs is uplink transmitted by the PHY layer according to a rule of the PHY-based prioritization. In the example in FIG. 2, because the first MAC PDU is for the DG $DG_{110}(1)$ and the second MAC PDU is for the CG $CG_{110}(0)$, rule (3) of the PHY-based prioritization rules described for step 102 applies. According to rule (3) of the PHY-based prioritization rules, the DG $DG_{110}(1)$ is prioritized. Thus, the PHY layer $PHY_{100}$ performs a step $S_{112}$ of uplink transmitting the first MAC PDU for the DG $DG_{110}(1)$ and performs a step $S_{114}$ of not uplink transmitting the second MAC PDU for the CG $CG_{110}(0)$. When the second MAC PDU for the CG $CG_{110}(0)$ is not uplink transmitted to the RAN node, because the RAN node does not know whether the second MAC PDU is not transmitted, or there is no second MAC PDU because every LCH mapped to the CG $CG_{110}(0)$ has no data, the RAN node may not issue a retransmission grant. Thus, the second MAC PDU is lost. Alternatively, uplink transmission for the second MAC PDU may be on-going when uplink transmission for the first MAC PDU starts, and the uplink transmission for the second MAC PDU is cancelled. The generation and cancellation of the second MAC PDU may be inefficient because uplink transmission for the two uplink grants (the DG $DG_{110}(1)$ and the CG $CG_{110}(0)$) is not on-going when the first MAC PDU and the second MAC PDU are generated and the first PHY priority of the DG $DG_{104}(1)$ and the second PHY priority of the CG $CG_{104}(0)$ are known when the DG $DG_{104}(1)$ and the CG $CG_{104}(0)$ are received in step 104.

For other levels of the PHY priorities of the DG and the CG, it can be understood on the basis of the above example that the modified existing method 100 has a deficiency of a MAC PDU loss, inefficiency due to a need for retransmission, or inefficiency due to a need for cancellation.

Thus, in the present disclosure, information for resolving the overlapping conflict by comparing the PHY priorities of the two uplink grants, respectively, is delivered by the PHY layer to the MAC layer. In this way, only one MAC PDU is generated for one of the two uplink grants using the information.

Figure 3:
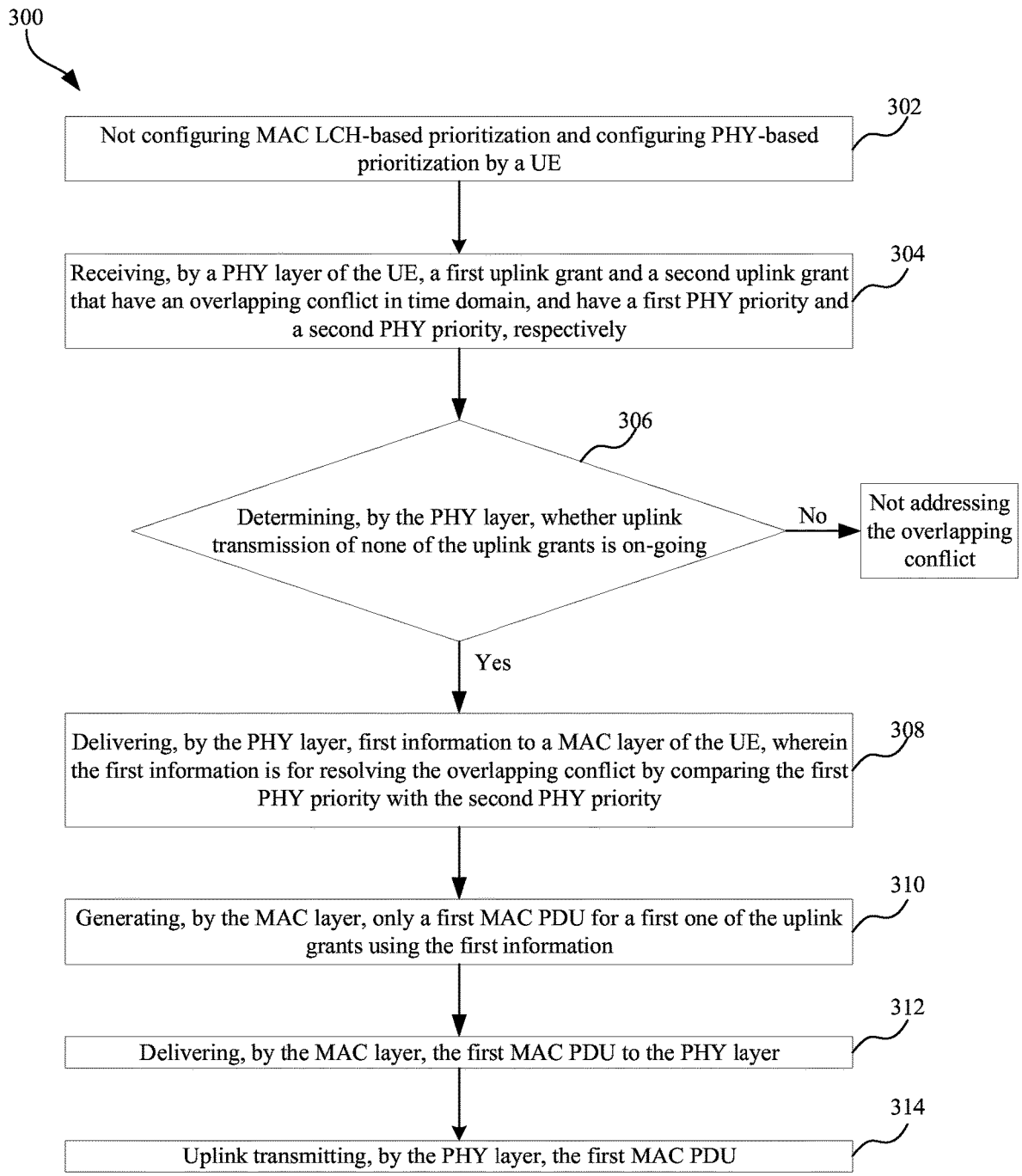
FIG. 3 is a flowchart of a method performed by a user equipment (UE) for physical layer-based prioritization (PHY-based prioritization) without the LCH-based prioritization in accordance with some embodiments of the present disclosure.

Referring to FIG. 3, FIG. 3 is a flowchart of a method 300 performed by a UE for PHY-based prioritization without MAC LCH-based prioritization in accordance with some embodiments of the present disclosure. The method 300 includes the following steps.

In step 302, MAC LCH-based prioritization is not configured and PHY-based prioritization is configured by the UE. As used here, when a capability of a UE such as MAC LCH-based prioritization or PHY-based prioritization of the UE is referred to as being "configured" or "not configured", the UE may support the capability and the capability may be "enabled" (corresponding to "configured") or "disabled" (corresponding to "not configured"), or the UE may "support" (corresponding to "configured") or "not support" (corresponding to "not configured") the capability. When the LCH-based prioritization is not configured by the UE, the LCH-based prioritization is not performed. When the PHY-based prioritization is configured by the UE, the PHY-based prioritization may be performed. The LCH-based prioritization has been described with reference to step 102 in FIG. 1 and is omitted here. An embodiment of rules of the PHY-based prioritization has been described with reference to step 102 in FIG. 1 and is omitted here. Other rules of the PHY-based prioritization that are known in the art to replace the corresponding rules of the PHY-based prioritization and be suitable for resolving an overlapping conflict by comparing PHY priorities of two uplink grants are within the contemplated scope of the present disclosure.

In step 304, a first uplink grant and a second uplink grant that have an overlapping conflict in time domain, and have a first PHY priority and a second PHY priority, respectively, is received by a PHY layer of the UE. Embodiments of step 304 illustrated with examples are to be described with reference to step 304 in FIG. 4 and step 304 in FIG. 9.

In step 306, whether uplink transmission for the uplink grants is not on-going is determined by the PHY layer. If so, the PHY-based prioritization of the method 300 is performed and thus, the steps 308, 310, 312, and 314 are performed. If not, the overlapping conflict is not addressed by the PHY-based prioritization of the method 300 because it is possible that cancellation needs to be performed.

In step 308, first information is delivered by the PHY layer to a MAC layer of the UE, wherein the first information is for resolving the overlapping conflict by comparing the first PHY priority with the second PHY priority. As used here, when information is referred to as being "for resolving the overlapping conflict by comparing the first PHY priority with the second PHY priority", the information explicitly or implicitly indicates the first PHY priority and the second PHY priority (i.e., possible levels of the PHY priorities can be directly or indirectly known from the information). For the information that explicitly indicates the first PHY priority and the second PHY priority, a comparison can be made between the first PHY priority and the second PHY priority in the information to resolve the overlapping conflict (i.e., select one of the uplink grants in the information) according to a rule of the PHY-based prioritization mentioned in step 302. For the information that implicitly indicates the first PHY priority and the second PHY priority, a comparison has been made between the first PHY priority and the second PHY priority to resolve the overlapping conflict (i.e., select one of the uplink grants) according to a rule of the PHY-based prioritization mentioned in step 302, and the information includes the selected one of the uplink grants but not the other one of the grants. Embodiments for explicit indication illustrated with examples are to be described with reference to step 402 and corresponding steps 404, 406, and 408 in FIG. 4. Embodiments for implicit indication illustrated with examples are to be described with reference to step 906, and corresponding steps 902 and 904 in FIG. 9.

In step 310, only a first MAC PDU for a first one of the uplink grants is generated using the first information by the MAC layer. Embodiments of step 310 illustrated with examples are to be described with reference to step 408 in FIG. 4 and step 310 in FIG. 9.

In step 312, the first MAC PDU is delivered by the MAC layer to the PHY layer. Embodiments of step 312 illustrated with examples are to be described with reference to step 312 in FIG. 4 and step 312 in FIG. 9.

In step 314, the first MAC PDU is uplink transmitted by the PHY layer. Embodiments of step 314 illustrated with examples are to be described with reference to step 314 in FIG. 4 and step 314 in FIG. 9.

Because the first information for resolving the overlapping conflict by comparing the first PHY priority with the second PHY priority is used for MAC PDU generation, only the first MAC PDU for the first one of the uplink grants is generated compared with the modified existing method 100 that generates two MAC PDUs generated in step 108. Thus, the deficiency of the MAC PDU loss, the inefficiency due to the need for retransmission, or the inefficiency due to the need for cancellation for the modified existing method 100 is improved.

Figure 4:
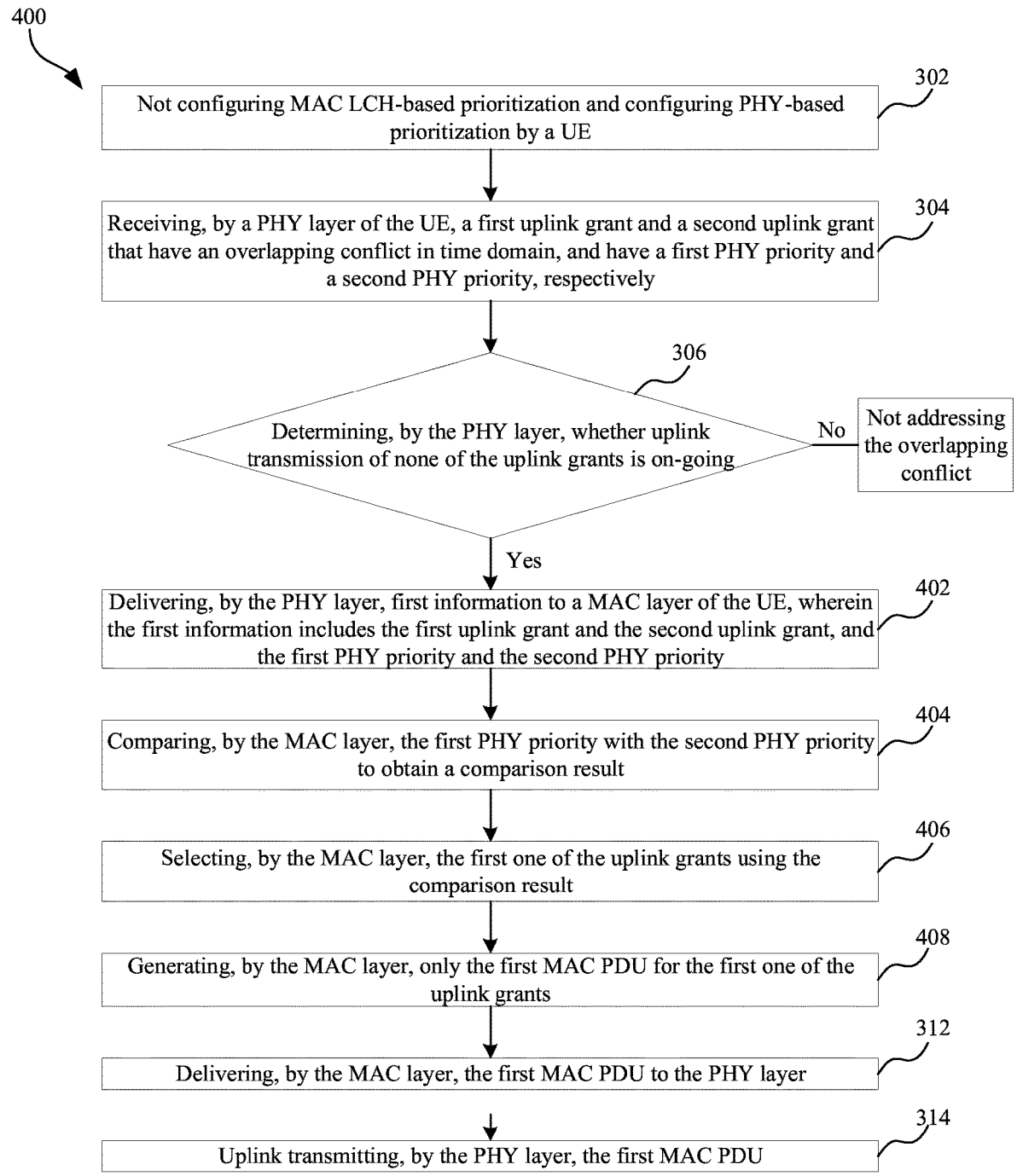
FIG. 4 is a flowchart illustrating a method by a UE for PHY-based prioritization without MAC LCH-based prioritization, wherein PHY priority comparison for the PHY-based prioritization is performed by a MAC layer, in accordance with some embodiments of the present disclosure.
Figure 5:
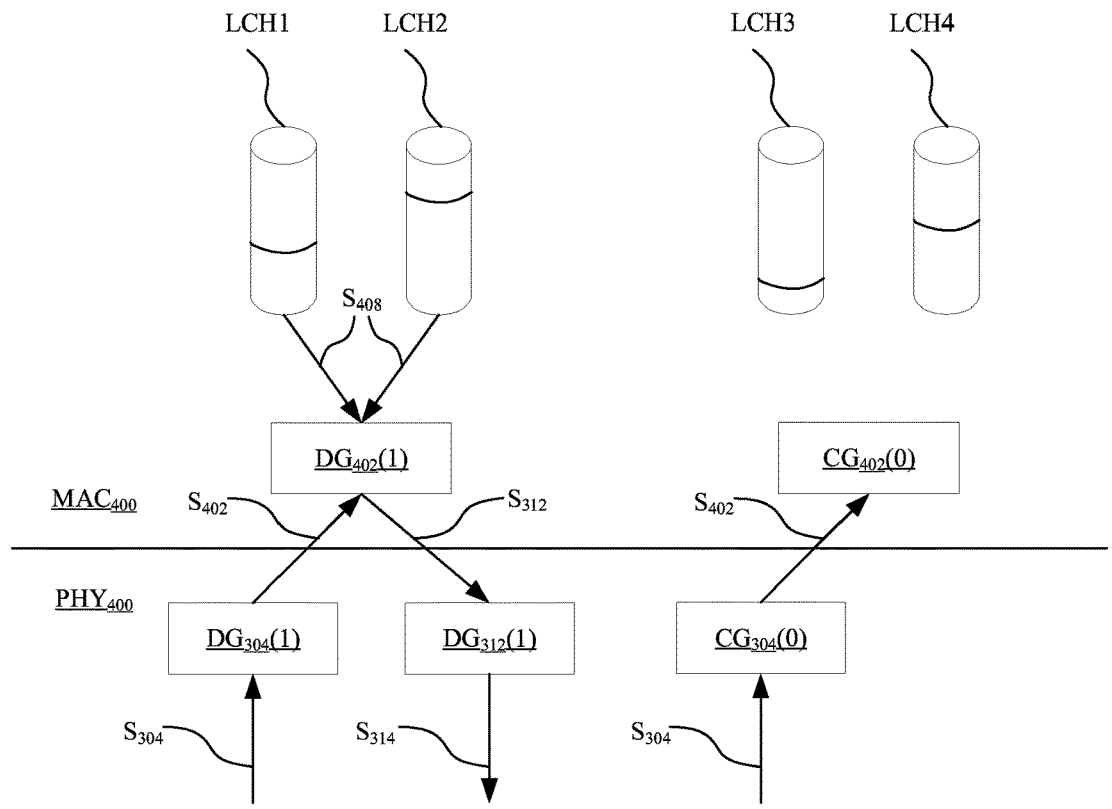
FIG. 5 is a schematic diagram illustrating an example of applying the method in FIG. 4 to an overlapping conflict in time domain between a DG with a high PHY priority and a CG with a low PHY priority.

Referring to FIGS. 4 and 5, FIG. 4 is a flowchart illustrating a method 400 by a UE for PHY-based prioritization without MAC LCH-based prioritization, wherein PHY priority comparison for the PHY-based prioritization is performed by a MAC layer, in accordance with some embodiments of the present disclosure. FIG. 5 is a schematic diagram illustrating an example of applying the method 400 to an overlapping conflict in time domain between a DG with a high PHY priority and a CG with a low PHY priority. The method 400 includes the following steps.

In step 302, MAC LCH-based prioritization is not configured and PHY-based prioritization is configured by a UE. The step 302 has been described with reference to step 302 in FIG. 3 and is omitted here.

In step 304, a first uplink grant and a second uplink grant that have an overlapping conflict in time domain, and have a first PHY priority and a second PHY priority, respectively, is received by a PHY layer of the UE. Illustratively, in the example in FIG. 5, the first uplink grant is a DG with a high PHY priority $DG_{304}(1)$ (i.e., with a priority index of 1 for the first PHY priority). The second uplink grant is a CG with a low PHY priority $CG_{304}(0)$ (i.e., with a priority index of 0 for the second PHY priority). The DG $DG_{304}(1)$ and the CG $CG_{304}(0)$ have an overlapping conflict in time domain, i.e., a PUSCH duration of the DG $DG_{304}(1)$ overlaps a PUSCH duration of the CG $CG_{304}(0)$. In step 304, a PHY layer $PHY_{400}$ of the UE performs a step $S_{304}$ of receiving the DG $DG_{304}(1)$ and the CG $CG_{304}(0)$.

In step 306, whether uplink transmission for the uplink grants is not on-going is determined by the PHY layer. The step 306 has been described with reference to step 306 in FIG. 3 and is omitted here.

In step 402, first information is delivered by the PHY layer to a MAC layer of the UE, wherein the first information includes the first uplink grant and the second uplink grant, and the first PHY priority and the second PHY priority. Step 402 is an embodiment of the step 308. In this embodiment, the first information explicitly indicates the first PHY priority and the second PHY priority. In the example in FIG. 5, in step 402, the PHY layer $PHY_{400}$ performs a step $S_{402}$ of delivering first information that includes the DG with the high PHY priority $DG_{304}(1)$ and the CG with the low PHY priority $CG_{304}(0)$ to a MAC layer $MAC_{400}$ of the UE. The DG with the high PHY priority in the MAC layer $MAC_{400}$ has the same content as the DG with the high PHY priority $DG_{304}(1)$ in the PHY layer $PHY_{400}$ and is denoted as $DG_{402}(1)$. The CG with the low PHY priority in the MAC layer $MAC_{400}$ has the same content as the CG with the low PHY priority $CG_{304}(0)$ is denoted as $CG_{402}(0)$.

The step 310 in FIG. 3 includes the steps 404, 406, and 408 in FIG. 4.

In step 404, the first PHY priority is compared with the second PHY priority to obtain a comparison result by the MAC layer. In the example in FIG. 5, in step 404, the MAC layer $MAC_{400}$ compares the first PHY priority of the DG with the high PHY priority $DG_{402}(1)$ and the second PHY priority of the CG with the low PHY priority $CG_{402}(0)$ to obtain that the first PHY priority of the DG $DG_{402}(1)$ is higher than the second PHY priority of the CG $CG_{402}(0)$ as a comparison result.

In step 406, the first one of the uplink grants is selected using the comparison result by the MAC layer. In the example in FIG. 5, in step 406, because the first PHY priority of the DG $DG_{402}(1)$ is higher than the second PHY priority of the CG $CG_{402}(0)$ in the comparison result, according to rule (3) of the PHY-based prioritization in step 302 described with reference to FIG. 3, the MAC layer $MAC_{400}$ selects the DG $DG_{402}(1)$ (i.e., the DG $DG_{402}(1)$ is the first one of the uplink grants).

In step 408, only the first MAC PDU for the first one of the uplink grants is generated by the MAC layer. In the example in FIG. 5, in step 408, the MAC layer $MAC_{400}$ performs a step $S_{408}$ of encapsulating, on the basis of LCP mapping restrictions, data from an LCH LCH1 and an LCH LCH2 into a first MAC PDU for the DG $DG_{402}(1)$ and not encapsulating, on the basis of LCP mapping restrictions, data from an LCH LCH3 and an LCH LCH4 into a second MAC PDU for the CG $CG_{402}(0)$. Thus, even when the LCH-based prioritization is not configured in step 302, only the first MAC PDU for the DG $DG_{402}(1)$ is generated. Examples of the LCP mapping restrictions have been described with reference to step 108 in FIG. 1 and are omitted here.

In step 312, the first MAC PDU is delivered by the MAC layer to the PHY layer. In the example in FIG. 5, in step 312, the MAC layer $MAC_{400}$ performs a step $S_{312}$ of delivering the first MAC PDU for the DG $DG_{402}(1)$ to the PHY layer $PHY_{400}$. The DG $DG_{402}(1)$ of which the first MAC PDU is received by the PHY layer $PHY_{400}$ is denoted as $DG_{312}(1)$. Because the second MAC PDU for the CG $CG_{402}(0)$ is not generated, the second MAC PDU for the CG $CG_{402}(0)$ is not delivered by the MAC layer $MAC_{400}$ to the PHY layer $PHY_{400}$ compared with the modified existing method 100 that delivers the second MAC PDU for the CG $CG_{106}$ by the MAC layer $MAC_{100}$ to the PHY layer $PHY_{100}$ in step 110 which results in the second MAC PDU for the CG $CG_{110}(0)$ in the PHY layer $PHY_{100}$.

In step 314, the first MAC PDU is uplink transmitted by the PHY layer. In the example in FIG. 5, the PHY layer $PHY_{400}$ performs a step $S_{314}$ of uplink transmitting the first MAC PDU for the DG $DG_{312}(1)$. Because the second MAC PDU for the CG $CG_{402}(0)$ is not generated, the deficiency of the loss of the second MAC PDU or the inefficiency due to the need for cancellation of the second MAC PDU is improved.

Figure 6:
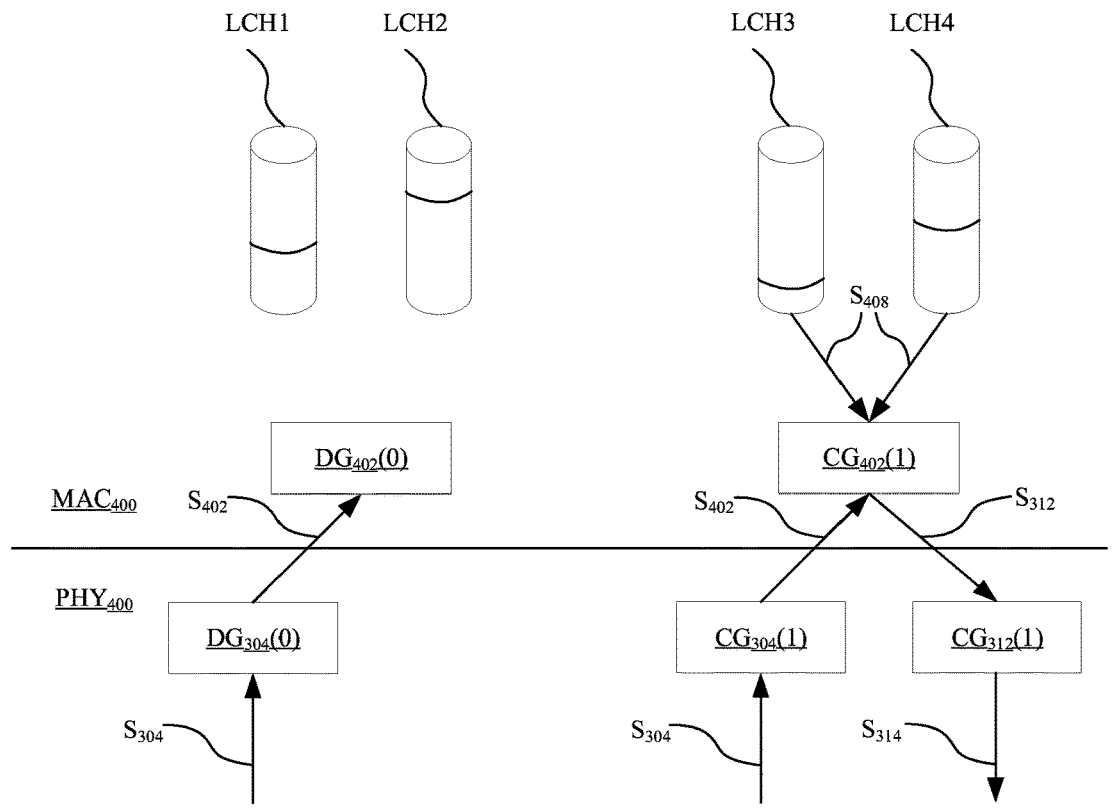
FIG. 6 is a schematic diagram illustrating an example of applying the method in FIG. 4 to an overlapping conflict in time domain between a DG with a low PHY priority and a CG with a high PHY priority.

Referring to FIGS. 4 and 6, FIG. 4 is a flowchart illustrating a method 400 by a UE for PHY-based prioritization without MAC LCH-based prioritization, wherein PHY priority comparison for the PHY-based prioritization is performed by a MAC layer, in accordance with some embodiments of the present disclosure. FIG. 6 is a schematic diagram illustrating an example of applying the method 400 to an overlapping conflict in time domain between a DG with a low PHY priority and a CG with a high PHY priority. The method 400 includes the following steps.

In step 302, MAC LCH-based prioritization is not configured and PHY-based prioritization is configured by a UE. The step 302 has been described with reference to step 302 in FIG. 3 and is omitted here.

In step 304, a first uplink grant and a second uplink grant that have an overlapping conflict in time domain, and have a first PHY priority and a second PHY priority, respectively, is received by a PHY layer of the UE. Illustratively, in the example in FIG. 6, the first uplink grant is a DG with a low PHY priority $DG_{304}(0)$ (i.e., with a priority index of 0 for the first PHY priority). The second uplink grant is a CG with a high PHY priority $CG_{304}(1)$ (i.e., with a priority index of 1 for the second PHY priority). The DG $DG_{304}(0)$ and the CG $CG_{304}(1)$ have an overlapping conflict in time domain, i.e., a PUSCH duration of the DG $DG_{304}(0)$ overlaps a PUSCH duration of the CG $CG_{304}(1)$. In step 304, a PHY layer $PHY_{400}$ of the UE performs a step $S_{304}$ of receiving the DG $DG_{304}(0)$ and the CG $CG_{304}(1)$.

In step 306, whether uplink transmission for the uplink grants is not on-going is determined by the PHY layer. The step 306 has been described with reference to step 306 in FIG. 3 and is omitted here.

In step 402, first information is delivered by the PHY layer to a MAC layer of the UE, wherein the first information includes the first uplink grant and the second uplink grant, and the first PHY priority and the second PHY priority. Step 402 is an embodiment of the step 308. In this embodiment, the first information explicitly indicates the first PHY priority and the second PHY priority. In the example in FIG. 6, in step 402, the PHY layer $PHY_{400}$ performs a step $S_{402}$ of delivering first information that includes the DG with the low PHY priority $DG_{304}(0)$ and the CG with the high PHY priority $CG_{304}(1)$ to a MAC layer $MAC_{400}$ of the UE. The DG with the low PHY priority in the MAC layer $MAC_{400}$ has the same content as the DG with the low PHY priority $DG_{304}(0)$ in the PHY layer $PHY_{400}$ and is denoted as $DG_{402}(0)$. The CG with the high PHY priority in the MAC layer $MAC_{400}$ has the same content as the CG with the high PHY priority $CG_{304}(1)$ is denoted as $CG_{402}(1)$.

The step 310 in FIG. 3 includes the steps 404, 406, and 408 in FIG. 4.

In step 404, the first PHY priority is compared with the second PHY priority to obtain a comparison result by the MAC layer. In the example in FIG. 6, in step 404, the MAC layer $MAC_{400}$ compares the first PHY priority of the DG with the low PHY priority $DG_{402}(0)$ and the second PHY priority of the CG with the high PHY priority $CG_{402}(1)$ to obtain that the second PHY priority of the CG $CG_{402}(1)$ is higher than the first PHY priority of the DG $DG_{402}(0)$ as a comparison result.

In step 406, the first one of the uplink grants is selected using the comparison result by the MAC layer. In the example in FIG. 6, in step 406, because the second PHY priority of the CG $CG_{402}(1)$ is higher than the first PHY priority of the DG $DG_{402}(0)$ in the comparison result, according to rule (1) of the PHY-based prioritization in step 302 described with reference to FIG. 3, the MAC layer $MAC_{400}$ selects the CG $CG_{402}(1)$ (i.e., the CG $CG_{402}(1)$ is the first one of the uplink grants).

In step 408, only the first MAC PDU for the first one of the uplink grants is generated by the MAC layer. In the example in FIG. 6, in step 408, the MAC layer $MAC_{400}$ performs a step $S_{408}$ of encapsulating, on the basis of LCP mapping restrictions, data from an LCH LCH3 and an LCH LCH4 into a first MAC PDU for the CG $CG_{402}(1)$ and not encapsulating, on the basis of LCP mapping restrictions, data from an LCH LCH1 and an LCH LCH2 into a second MAC PDU for the DG $DG_{402}(0)$. Thus, even when the LCH-based prioritization is not configured in step 302, only the first MAC PDU for the CG $CG_{402}(1)$ is generated. Examples of the LCP mapping restrictions have been described with reference to step 108 in FIG. 1 and are omitted here.

In step 312, the first MAC PDU is delivered by the MAC layer to the PHY layer. In the example in FIG. 6, in step 312, the MAC layer $MAC_{400}$ performs a step $S_{312}$ of delivering the first MAC PDU for the CG $CG_{402}(1)$ to the PHY layer $PHY_{400}$. The CG $CG_{402}(1)$ of which the first MAC PDU is received by the PHY layer $PHY_{400}$ is denoted as $CG_{312}(1)$. Because the second MAC PDU for the DG $DG_{402}(0)$ is not generated, the second MAC PDU for the DG $DG_{402}(0)$ is not delivered by the MAC layer $MAC_{400}$ to the PHY layer $PHY_{400}$ compared with the modified existing method 100 that delivers the second MAC PDU for the CG $CG_{106}$ by the MAC layer $MAC_{100}$ to the PHY layer $PHY_{100}$ in step 110 which results in the second MAC PDU for the CG $CG_{110}(0)$ in the PHY layer $PHY_{100}$.

In step 314, the first MAC PDU is uplink transmitted by the PHY layer. In the example in FIG. 6, the PHY layer $PHY_{400}$ performs a step $S_{314}$ of uplink transmitting the first MAC PDU for the CG $CG_{312}(1)$. Because the second MAC PDU for the DG $DG_{402}(0)$ is not generated, the deficiency of the loss of the second MAC PDU, the inefficiency due to the need for retransmission, or the inefficiency due to the need for cancellation of the second MAC PDU is improved.

Figure 7:
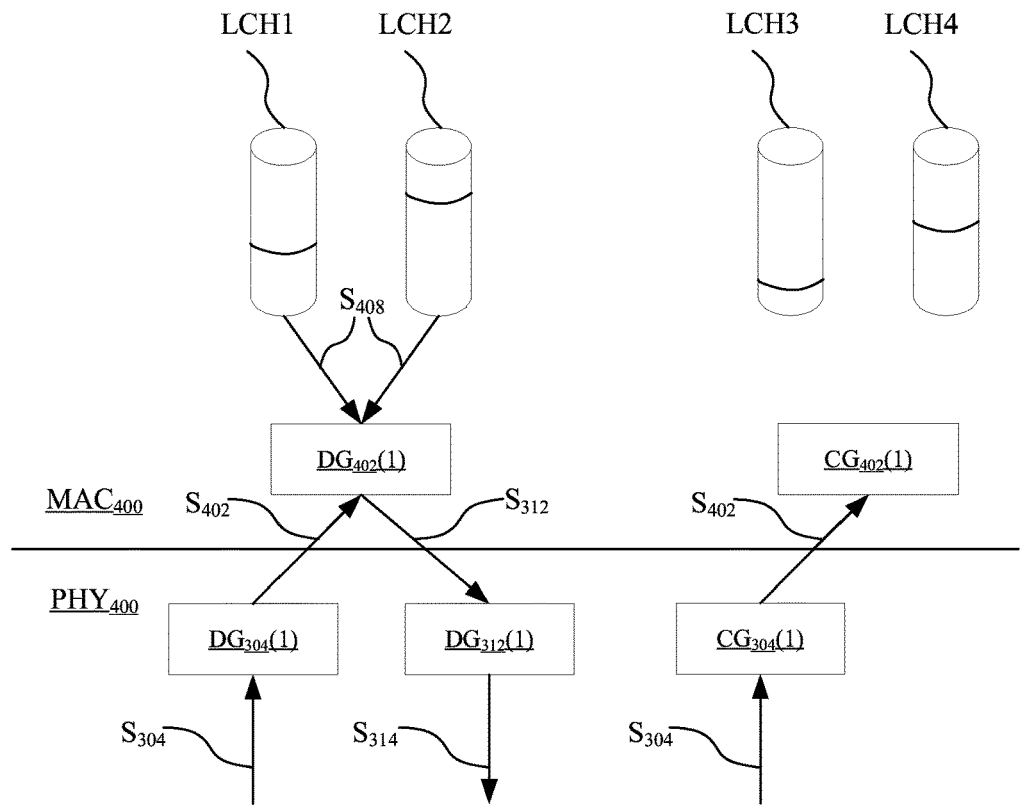
FIG. 7 is a schematic diagram illustrating an example of applying the method in FIG. 4 to an overlapping conflict in time domain between a DG with a high PHY priority and a CG with a high PHY priority.

Referring to FIGS. 4 and 7, FIG. 4 is a flowchart illustrating a method 400 by a UE for PHY-based prioritization without MAC LCH-based prioritization, wherein PHY priority comparison for the PHY-based prioritization is performed by a MAC layer, in accordance with some embodiments of the present disclosure. FIG. 7 is a schematic diagram illustrating an example of applying the method 400 to an overlapping conflict in time domain between a DG with a high PHY priority and a CG with a high PHY priority. The method 400 includes the following steps.

In step 302, MAC LCH-based prioritization is not configured and PHY-based prioritization is configured by a UE. The step 302 has been described with reference to step 302 in FIG. 3 and is omitted here.

In step 304, a first uplink grant and a second uplink grant that have an overlapping conflict in time domain, and have a first PHY priority and a second PHY priority, respectively, is received by a PHY layer of the UE. Illustratively, in the example in FIG. 7, the first uplink grant is a DG with a high PHY priority $DG_{304}(1)$ (i.e., with a priority index of 1 for the first PHY priority). The second uplink grant is a CG with a high PHY priority $CG_{304}(1)$ (i.e., with a priority index of 1 for the second PHY priority). The DG $DG_{304}(1)$ and the CG $CG_{304}(1)$ have an overlapping conflict in time domain, i.e., a PUSCH duration of the DG $DG_{304}(1)$ overlaps a PUSCH duration of the CG $CG_{304}(1)$. In step 304, a PHY layer $PHY_{400}$ of the UE performs a step $S_{304}$ of receiving the DG $DG_{304}(1)$ and the CG $CG_{304}(1)$.

In step 306, whether uplink transmission for the uplink grants is not on-going is determined by the PHY layer. The step 306 has been described with reference to step 306 in FIG. 3 and is omitted here.

In step 402, first information is delivered by the PHY layer to a MAC layer of the UE, wherein the first information includes the first uplink grant and the second uplink grant, and the first PHY priority and the second PHY priority. Step 402 is an embodiment of the step 308. In this embodiment, the first information explicitly indicates the first PHY priority and the second PHY priority. In the example in FIG. 7, in step 402, the PHY layer $PHY_{400}$ performs a step $S_{402}$ of delivering first information that includes the DG with the high PHY priority $DG_{304}(1)$ and the CG with the high PHY priority $CG_{304}(1)$ to a MAC layer $MAC_{400}$ of the UE. The DG with the high PHY priority in the MAC layer $MAC_{400}$ has the same content as the DG with the high PHY priority $DG_{304}(1)$ in the PHY layer $PHY_{400}$ and is denoted as $DG_{402}(1)$. The CG with the high PHY priority in the MAC layer $MAC_{400}$ has the same content as the CG with the high PHY priority $CG_{304}(1)$ is denoted as $CG_{402}(1)$.

The step 310 in FIG. 3 includes the steps 404, 406, and 408 in FIG. 4.

In step 404, the first PHY priority is compared with the second PHY priority to obtain a comparison result by the MAC layer. In the example in FIG. 7, in step 404, the MAC layer $MAC_{400}$ compares the first PHY priority of the DG with the high PHY priority $DG_{402}(1)$ and the second PHY priority of the CG with the high PHY priority $CG_{402}(1)$ to obtain that the first PHY priority of the DG $DG_{402}(1)$ is the same as the second PHY priority of the CG $CG_{402}(1)$ as a comparison result.

In step 406, the first one of the uplink grants is selected using the comparison result by the MAC layer. In the example in FIG. 7, in step 406, because the first PHY priority of the DG $DG_{402}(1)$ is the same as the second PHY priority of the CG $CG_{402}(1)$ in the comparison result, according to rule (4) of the PHY-based prioritization in step 302 described with reference to FIG. 3, the MAC layer $MAC_{400}$ selects a predetermined one of the uplink grants which is the DG $DG_{402}(1)$ (i.e., the DG $DG_{402}(1)$ is the first one of the uplink grants).

In step 408, only the first MAC PDU for the first one of the uplink grants is generated by the MAC layer. In the example in FIG. 7, in step 408, the MAC layer $MAC_{400}$ performs a step $S_{408}$ of encapsulating, on the basis of LCP mapping restrictions, data from an LCH LCH1 and an LCH LCH2 into a first MAC PDU for the DG $DG_{402}(1)$ and not encapsulating, on the basis of LCP mapping restrictions, data from an LCH LCH3 and an LCH LCH4 into a second MAC PDU for the CG $CG_{402}(1)$. Thus, even when the LCH-based prioritization is not configured in step 302, only the first MAC PDU for the DG $CG_{402}(1)$ is generated. Examples of the LCP mapping restrictions have been described with reference to step 108 in FIG. 1 and are omitted here.

In step 312, the first MAC PDU is delivered by the MAC layer to the PHY layer. In the example in FIG. 7, in step 312, the MAC layer $MAC_{400}$ performs a step $S_{312}$ of delivering the first MAC PDU for the DG $DG_{402}(1)$ to the PHY layer $PHY_{400}$. The DG $DG_{402}(1)$ of which the first MAC PDU is received by the PHY layer $PHY_{400}$ is denoted as $DG_{312}(1)$. Because the second MAC PDU for the CG $CG_{402}(1)$ is not generated, the second MAC PDU for the CG $CG_{402}(1)$ is not delivered by the MAC layer $MAC_{400}$ to the PHY layer $PHY_{400}$ compared with the modified existing method 100 that delivers the second MAC PDU for the CG $CG_{106}$ by the MAC layer $MAC_{100}$ to the PHY layer $PHY_{100}$ in step 110 which results in the second MAC PDU for the CG $CG_{110}(1)$ in the PHY layer $PHY_{100}$.

In step 314, the first MAC PDU is uplink transmitted by the PHY layer. In the example in FIG. 7, the PHY layer $PHY_{400}$ performs a step $S_{314}$ of uplink transmitting the first MAC PDU for the DG $DG_{402}(1)$. Because the second MAC PDU for the CG $DG_{402}(1)$ is not generated, the deficiency of the loss of the second MAC PDU or the inefficiency due to the need for cancellation of the second MAC PDU is improved.

Figure 8:
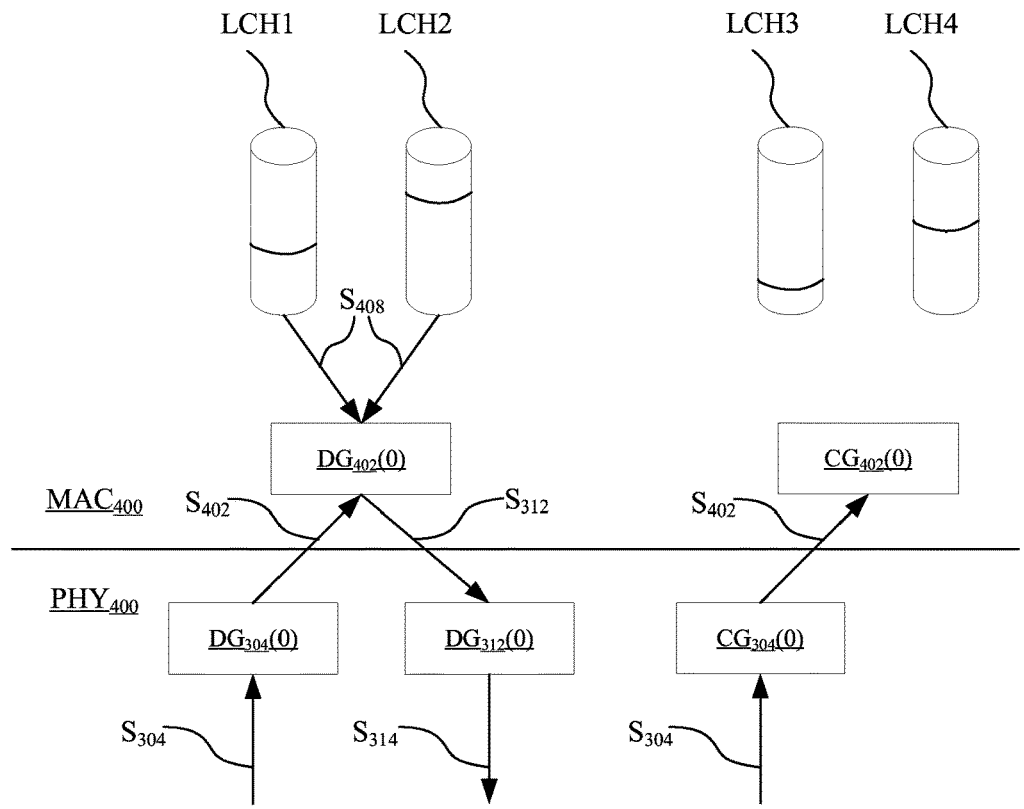
FIG. 8 is a schematic diagram illustrating an example of applying the method in FIG. 4 to an overlapping conflict in time domain between a DG with a low PHY priority and a CG with a low PHY priority.

Referring to FIGS. 4 and 8, FIG. 4 is a flowchart illustrating a method 400 by a UE for PHY-based prioritization without MAC LCH-based prioritization, wherein PHY priority comparison for the PHY-based prioritization is performed by a MAC layer, in accordance with some embodiments of the present disclosure. FIG. 8 is a schematic diagram illustrating an example of applying the method 400 to an overlapping conflict in time domain between a DG with a low PHY priority and a CG with a low PHY priority. The method 400 includes the following steps.

In step 302, MAC LCH-based prioritization is not configured and PHY-based prioritization is configured by a UE. The step 302 has been described with reference to step 302 in FIG. 3 and is omitted here.

In step 304, a first uplink grant and a second uplink grant that have an overlapping conflict in time domain, and have a first PHY priority and a second PHY priority, respectively, is received by a PHY layer of the UE. Illustratively, in the example in FIG. 8, the first uplink grant is a DG with a low PHY priority $DG_{304}(0)$ (i.e., with a priority index of 0 for the first PHY priority). The second uplink grant is a CG with a low PHY priority $CG_{304}(0)$ (i.e., with a priority index of 0 for the second PHY priority). The DG $DG_{304}(0)$ and the CG $CG_{304}(0)$ have an overlapping conflict in time domain, i.e., a PUSCH duration of the DG $DG_{304}(0)$ overlaps a PUSCH duration of the CG $CG_{304}(0)$. In step 304, a PHY layer $PHY_{400}$ of the UE performs a step $S_{304}$ of receiving the DG $DG_{304}(0)$ and the CG $CG_{304}(0)$.

In step 306, whether uplink transmission for the uplink grants is not on-going is determined by the PHY layer. The step 306 has been described with reference to step 306 in FIG. 3 and is omitted here.

In step 402, first information is delivered by the PHY layer to a MAC layer of the UE, wherein the first information includes the first uplink grant and the second uplink grant, and the first PHY priority and the second PHY priority. Step 402 is an embodiment of the step 308. In this embodiment, the first information explicitly indicates the first PHY priority and the second PHY priority. In the example in FIG. 8, in step 402, the PHY layer $PHY_{400}$ performs a step $S_{402}$ of delivering first information that includes the DG with the low PHY priority $DG_{304}(0)$ and the CG with the low PHY priority $CG_{304}(0)$ to a MAC layer $MAC_{400}$ of the UE. The DG with the low PHY priority in the MAC layer $MAC_{400}$ has the same content as the DG with the low PHY priority $DG_{304}(0)$ in the PHY layer $PHY_{400}$ and is denoted as $DG_{402}(0)$. The CG with the low PHY priority in the MAC layer $MAC_{400}$ has the same content as the CG with the low PHY priority $CG_{304}(0)$ is denoted as $CG_{402}(0)$.

The step 310 in FIG. 3 includes the steps 404, 406, and 408 in FIG. 4.

In step 404, the first PHY priority is compared with the second PHY priority to obtain a comparison result by the MAC layer. In the example in FIG. 8, in step 404, the MAC layer $MAC_{400}$ compares the first PHY priority of the DG with the low PHY priority $DG_{402}(0)$ and the second PHY priority of the CG with the low PHY priority $CG_{402}(0)$ to obtain that the first PHY priority of the DG $DG_{402}(0)$ is the same as the second PHY priority of the CG $CG_{402}(0)$ as a comparison result.

In step 406, the first one of the uplink grants is selected using the comparison result by the MAC layer. In the example in FIG. 8, in step 406, because the first PHY priority of the DG $DG_{402}(0)$ is the same as the second PHY priority of the CG $CG_{402}(0)$ in the comparison result, according to rule (4) of the PHY-based prioritization in step 302 described with reference to FIG. 3, the MAC layer $MAC_{400}$ selects a predetermined one of the uplink grants which is the DG $DG_{402}(0)$ (i.e., the DG $DG_{402}(0)$ is the first one of the uplink grants).

In step 408, only the first MAC PDU for the first one of the uplink grants is generated by the MAC layer. In the example in FIG. 8, in step 408, the MAC layer $MAC_{400}$ performs a step $S_{408}$ of encapsulating, on the basis of LCP mapping restrictions, data from an LCH LCH1 and an LCH LCH2 into a first MAC PDU for the DG $DG_{402}(0)$ and not encapsulating, on the basis of LCP mapping restrictions, data from an LCH LCH3 and an LCH LCH4 into a second MAC PDU for the CG $CG_{402}(0)$. Thus, even when the LCH-based prioritization is not configured in step 302, only the first MAC PDU for the DG $CG_{402}(0)$ is generated. Examples of the LCP mapping restrictions have been described with reference to step 108 in FIG. 1 and are omitted here.

In step 312, the first MAC PDU is delivered by the MAC layer to the PHY layer. In the example in FIG. 8, in step 312, the MAC layer $MAC_{400}$ performs a step $S_{312}$ of delivering the first MAC PDU for the DG $DG_{402}(0)$ to the PHY layer $PHY_{400}$. The DG $DG_{402}(0)$ of which the first MAC PDU is received by the PHY layer $PHY_{400}$ is denoted as $DG_{312}(0)$. Because the second MAC PDU for the CG $CG_{402}(0)$ is not generated, the second MAC PDU for the CG $CG_{402}(0)$ is not delivered by the MAC layer $MAC_{400}$ to the PHY layer $PHY_{400}$ compared with the modified existing method 100 that delivers the second MAC PDU for the CG $CG_{106}$ by the MAC layer $MAC_{100}$ to the PHY layer $PHY_{100}$ in step 110 which results in the second MAC PDU for the CG $CG_{110}(0)$ in the PHY layer $PHY_{100}$.

In step 314, the first MAC PDU is uplink transmitted by the PHY layer. In the example in FIG. 8, the PHY layer $PHY_{400}$ performs a step $S_{314}$ of uplink transmitting the first MAC PDU for the DG $DG_{402}(0)$. Because the second MAC PDU for the CG $CG_{402}(0)$ is not generated, the deficiency of the loss of the second MAC PDU or the inefficiency due to the need for cancellation of the second MAC PDU is improved.

Figure 9:
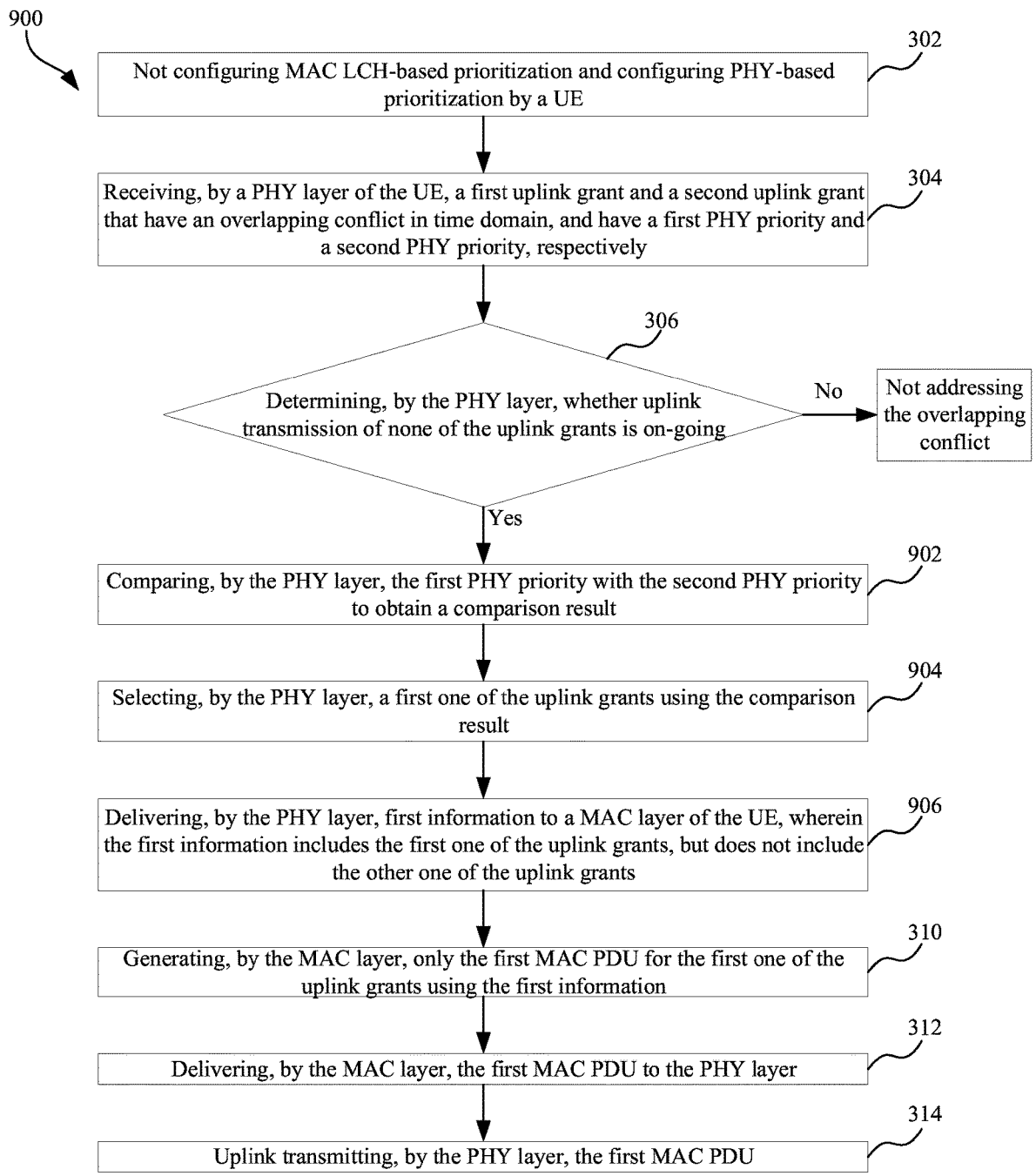
FIG. 9 is a flowchart illustrating a method by a UE for PHY-based prioritization without MAC LCH-based prioritization, wherein PHY priority comparison for the PHY-based prioritization is performed by a PHY layer, in accordance with some embodiments of the present disclosure.
Figure 10:
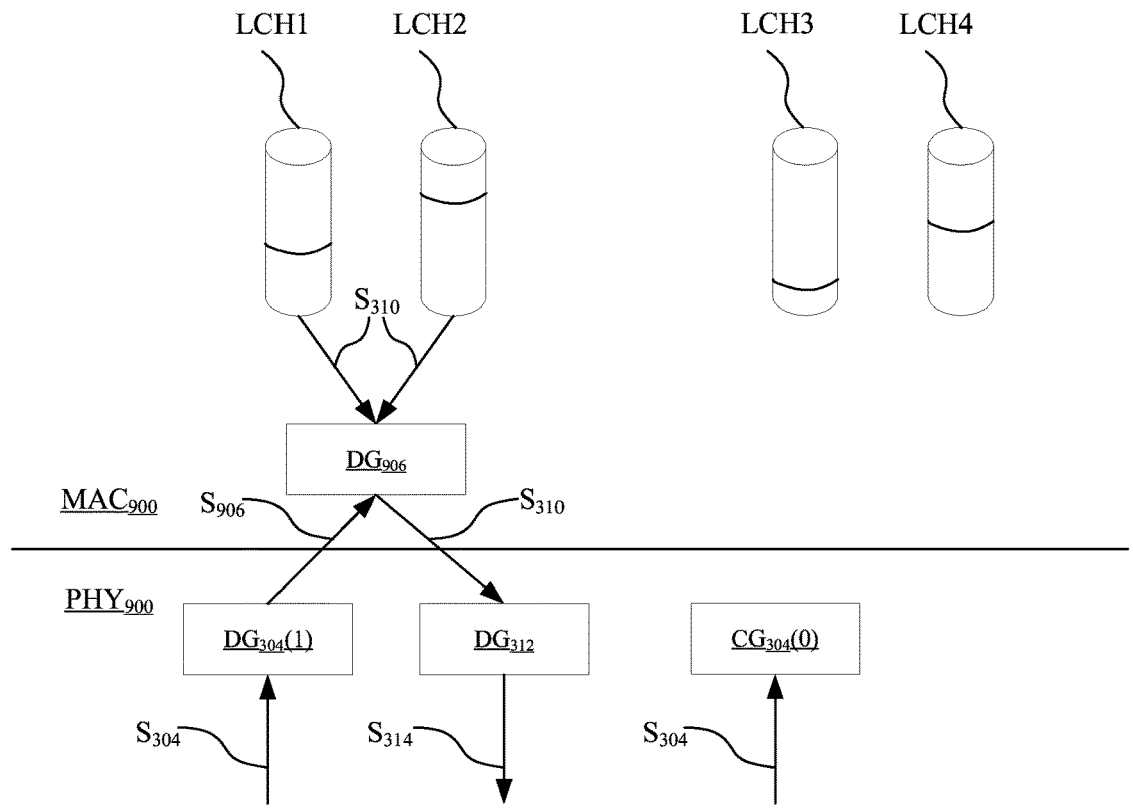
FIG. 10 is a schematic diagram illustrating an example of applying the method in FIG. 9 to an overlapping conflict in time domain between a DG with a high PHY priority and a CG with a low PHY priority.

Referring to FIGS. 9 and 10, FIG. 9 is a flowchart illustrating a method 900 by a UE for PHY-based prioritization without MAC LCH-based prioritization, wherein PHY priority comparison for the PHY-based prioritization is performed by a PHY layer, in accordance with some embodiments of the present disclosure. FIG. 10 is a schematic diagram illustrating an example of applying the method 900 to an overlapping conflict in time domain between a DG with a high PHY priority and a CG with a low PHY priority. The method 900 includes the following steps.

In step 302, MAC LCH-based prioritization is not configured and PHY-based prioritization is configured by a UE. The step 302 has been described with reference to step 302 in FIG. 3 and is omitted here.

In step 304, a first uplink grant and a second uplink grant that have an overlapping conflict in time domain, and have a first PHY priority and a second PHY priority, respectively, is received by a PHY layer of the UE. Illustratively, in the example in FIG. 10, the first uplink grant is a DG with a high PHY priority $DG_{304}(1)$ (i.e., with a priority index of 1 for the first PHY priority). The second uplink grant is a CG with a low PHY priority $CG_{304}(0)$ (i.e., with a priority index of 0 for the second PHY priority). The DG $DG_{304}(1)$ and the CG $CG_{304}(0)$ have an overlapping conflict in time domain, i.e., a PUSCH duration of the DG $DG_{304}(1)$ overlaps a PUSCH duration of the CG $CG_{304}(0)$. In step 304, a PHY layer $PHY_{900}$ of the UE performs a step $S_{304}$ of receiving the DG $DG_{304}(1)$ and the CG $CG_{304}(0)$.

In step 306, whether uplink transmission for the uplink grants is not on-going is determined by the PHY layer. The step 306 has been described with reference to step 306 in FIG. 3 and is omitted here.

Steps 902 to 906 are further included by the method 300 in FIG. 3 between steps 306 and 308. The step 906 is an embodiment of the step 308 in FIG. 3.

In step 902, the first PHY priority is compared with the second PHY priority to obtain a comparison result by the PHY layer. In the example in FIG. 10, in step 902, the PHY layer $PHY_{900}$ compares the first PHY priority of the DG with the high PHY priority $DG_{304}(1)$ and the second PHY priority of the CG with the low PHY priority $CG_{304}(0)$ to obtain that the first PHY priority of the DG $DG_{304}(1)$ is higher than the second PHY priority of the CG $CG_{304}(0)$ as a comparison result.

In step 904, the first one of the uplink grants is selected using the comparison result by the PHY layer. In the example in FIG. 10, in step 904, because the first PHY priority of the DG $DG_{304}(1)$ is higher than the second PHY priority of the CG $CG_{304}(0)$ in the comparison result, according to rule (3) of the PHY-based prioritization in step 302 described with reference to FIG. 3, the PHY layer $PHY_{900}$ selects the DG $DG_{304}(1)$ (i.e., the DG $DG_{304}(1)$ is the first one of the uplink grants).

In step 906, first information is delivered by the PHY layer to a MAC layer of the UE, wherein the first information includes the first one of the uplink grants, but does not include the other one of the uplink grants. As mentioned above, step 906 is an embodiment of the step 308. In this embodiment, the first information implicitly indicates the first PHY priority and the second PHY priority. In the example in FIG. 10, in step 906, the PHY layer $PHY_{900}$ performs a step $S_{906}$ of delivering first information that includes the DG without the first PHY priority $DG_{906}$ but does not include the CG with the second PHY priority $CG_{304}(0)$ or the CG without the second PHY priority $CG_{304}$ to a MAC layer $MAC_{900}$ of the UE. The DG $DG_{906}$ has the same content as the DG $DG_{304}(1)$ except the DG $DG_{906}$ does not have information of the first PHY priority.

In step 310, only the first MAC PDU for the first one of the uplink grants is generated by the MAC layer. In the example in FIG. 10, in step 310, the MAC layer $MAC_{900}$ performs a step $S_{310}$ of encapsulating, on the basis of LCP mapping restrictions, data from an LCH LCH1 and an LCH LCH2 into a first MAC PDU for the DG $DG_{906}$. Because the first information does not include the CG $CG_{304}(0)$ or $CG_{304}$, the step $S_{310}$ further includes not encapsulating, on the basis of LCP mapping restrictions, data from an LCH LCH3 and an LCH LCH4 into a second MAC PDU for the CG $CG_{304}(0)$ or $CG_{304}$. Thus, even when the LCH-based prioritization is not configured in step 302, only the first MAC PDU for the DG $DG_{906}$ is generated. Examples of the LCP mapping restrictions have been described with reference to step 108 in FIG. 1 and are omitted here.

In step 312, the first MAC PDU is delivered by the MAC layer to the PHY layer. In the example in FIG. 10, in step 312, the MAC layer $MAC_{900}$ performs a step $S_{312}$ of delivering the first MAC PDU for the DG $DG_{906}$ to the PHY layer $PHY_{900}$. The DG $DG_{906}$ of which the first MAC PDU is received by the PHY layer $PHY_{900}$ is denoted as $DG_{312}$. Because the second MAC PDU for the CG $CG_{304}(0)$ or $CG_{304}$ is not generated, the second MAC PDU for the CG $CG_{304}(0)$ or $CG_{304}$ is not delivered by the MAC layer $MAC_{900}$ to the PHY layer $PHY_{900}$ compared with the modified existing method 100 that delivers the second MAC PDU for the CG $CG_{106}$ by the MAC layer $MAC_{100}$ to the PHY layer $PHY_{100}$ in step 110 which results in the second MAC PDU for the CG $CG_{110}(0)$ in the PHY layer $PHY_{100}$.

In step 314, the first MAC PDU is uplink transmitted by the PHY layer. In the example in FIG. 10, the PHY layer $PHY_{900}$ performs a step $S_{314}$ of uplink transmitting the first MAC PDU for the DG $DG_{312}$. Because the second MAC PDU for the CG $CG_{304}(0)$ or $CG_{304}$ is not generated, the deficiency of the loss of the second MAC PDU or the inefficiency due to the need for cancellation of the second MAC PDU is improved.

Figure 11:
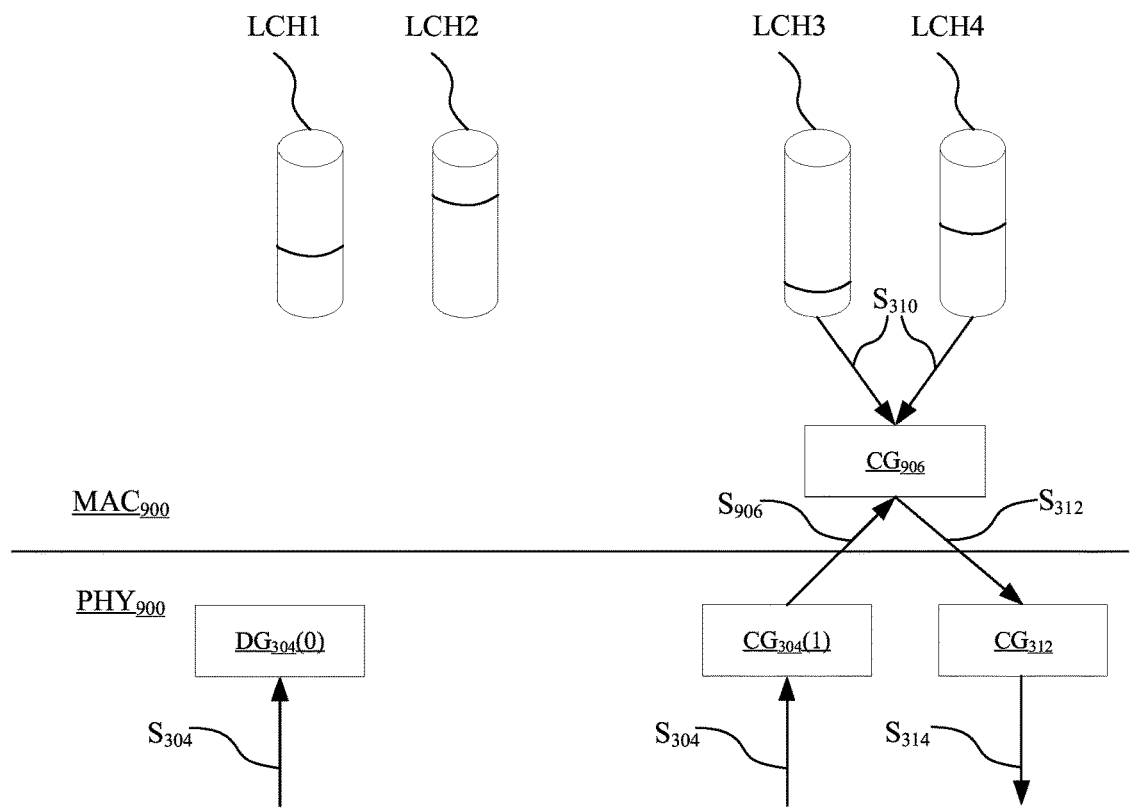
FIG. 11 is a schematic diagram illustrating an example of applying the method in FIG. 9 to an overlapping conflict in time domain between a DG with a low PHY priority and a CG with a high PHY priority.

Referring to FIGS. 9 and 11, FIG. 9 is a flowchart illustrating a method 900 by a UE for PHY-based prioritization without MAC LCH-based prioritization, wherein PHY priority comparison for the PHY-based prioritization is performed by a PHY layer, in accordance with some embodiments of the present disclosure. FIG. 11 is a schematic diagram illustrating an example of applying the method 900 to an overlapping conflict in time domain between a DG with a low PHY priority and a CG with a high PHY priority. The method 900 includes the following steps.

In step 302, MAC LCH-based prioritization is not configured and PHY-based prioritization is configured by a UE. The step 302 has been described with reference to step 302 in FIG. 3 and is omitted here.

In step 304, a first uplink grant and a second uplink grant that have an overlapping conflict in time domain, and have a first PHY priority and a second PHY priority, respectively, is received by a PHY layer of the UE. Illustratively, in the example in FIG. 11, the first uplink grant is a DG with a low PHY priority $DG_{304}(0)$ (i.e., with a priority index of 0 for the first PHY priority). The second uplink grant is a CG with a high PHY priority $CG_{304}(1)$ (i.e., with a priority index of 1 for the second PHY priority). The DG $DG_{304}(0)$ and the CG $CG_{304}(1)$ have an overlapping conflict in time domain, i.e., a PUSCH duration of the DG $DG_{304}(0)$ overlaps a PUSCH duration of the CG $CG_{304}(1)$. In step 304, a PHY layer $PHY_{900}$ of the UE performs a step $S_{304}$ of receiving the DG $DG_{304}(0)$ and the CG $CG_{304}(1)$.

In step 306, whether uplink transmission for the uplink grants is not on-going is determined by the PHY layer. The step 306 has been described with reference to step 306 in FIG. 3 and is omitted here.

Steps 902 to 906 are further included by the method 300 in FIG. 3 between steps 306 and 308. The step 906 is an embodiment of the step 308 in FIG. 3.

In step 902, the first PHY priority is compared with the second PHY priority to obtain a comparison result by the PHY layer. In the example in FIG. 11, in step 902, the PHY layer $PHY_{900}$ compares the first PHY priority of the DG with the low PHY priority $DG_{304}(0)$ and the second PHY priority of the CG with the high PHY priority $CG_{304}(1)$ to obtain that the second PHY priority of the CG $CG_{304}(1)$ is higher than the first PHY priority of the DG $DG_{304}(0)$ as a comparison result.

In step 904, the first one of the uplink grants is selected using the comparison result by the PHY layer. In the example in FIG. 11, in step 904, because the second PHY priority of the CG $CG_{304}(1)$ is higher than the first PHY priority of the DG $DG_{304}(0)$ in the comparison result, according to rule (1) of the PHY-based prioritization in step 302 described with reference to FIG. 3, the PHY layer $PHY_{900}$ selects the CG $CG_{304}(1)$ (i.e., the CG $CG_{304}(1)$ is the first one of the uplink grants).

In step 906, first information is delivered by the PHY layer to a MAC layer of the UE, wherein the first information includes the first one of the uplink grants, but does not include the other one of the uplink grants. As mentioned above, step 906 is an embodiment of the step 308. In this embodiment, the first information implicitly indicates the first PHY priority and the second PHY priority. In the example in FIG. 11, in step 906, the PHY layer $PHY_{900}$ performs a step $S_{906}$ of delivering first information that includes the CG without the second PHY priority $CG_{906}$ but does not include the DG with the first PHY priority $DG_{304}$ (0) or the DG without the first PHY priority $DG_{304}$ to a MAC layer $MAC_{900}$ of the UE. The CG $CG_{906}$ has the same content as the CG $CG_{304}(1)$ except the CG $CG_{906}$ does not have information of the second PHY priority.

In step 310, only the first MAC PDU for the first one of the uplink grants is generated by the MAC layer. In the example in FIG. 11, in step 310, the MAC layer $MAC_{900}$ performs a step $S_{310}$ of encapsulating, on the basis of LCP mapping restrictions, data from an LCH LCH1 and an LCH LCH2 into a first MAC PDU for the CG $CG_{906}$. Because the first information does not include the DG $DG_{304}(0)$ or $DG_{304}$, the step $S_{310}$ further includes not encapsulating, on the basis of LCP mapping restrictions, data from an LCH LCH3 and an LCH LCH4 into a second MAC PDU for the DG $DG_{304}(0)$ or $DG_{304}$. Thus, even when the LCH-based prioritization is not configured in step 302, only the first MAC PDU for the CG $CG_{906}$ is generated. Examples of the LCP mapping restrictions have been described with reference to step 108 in FIG. 1 and are omitted here.

In step 312, the first MAC PDU is delivered by the MAC layer to the PHY layer. In the example in FIG. 11, in step 312, the MAC layer $MAC_{900}$ performs a step $S_{312}$ of delivering the first MAC PDU for the CG $CG_{906}$ to the PHY layer $PHY_{900}$. The CG $CG_{906}$ of which the first MAC PDU is received by the PHY layer $PHY_{900}$ is denoted as $CG_{312}$. Because the second MAC PDU for the DG $DG_{304}(0)$ or $DG_{304}$ is not generated, the second MAC PDU for the DG $DG_{304}(0)$ or $DG_{304}$ is not delivered by the MAC layer $MAC_{900}$ to the PHY layer $PHY_{900}$ compared with the modified existing method 100 that delivers the second MAC PDU for the CG $CG_{106}$ by the MAC layer $MAC_{100}$ to the PHY layer $PHY_{100}$ in step 110 which results in the second MAC PDU for the CG $CG_{110}(0)$ in the PHY layer $PHY_{100}$.

In step 314, the first MAC PDU is uplink transmitted by the PHY layer. In the example in FIG. 11, the PHY layer $PHY_{900}$ performs a step $S_{314}$ of uplink transmitting the first MAC PDU for the CG $CG_{312}$. Because the second MAC PDU for the DG $DG_{304}(0)$ or $DG_{304}$ is not generated, the deficiency of the loss of the second MAC PDU, the inefficiency due to the need for retransmission, or the inefficiency due to the need for cancellation of the second MAC PDU is improved.

Figure 12:
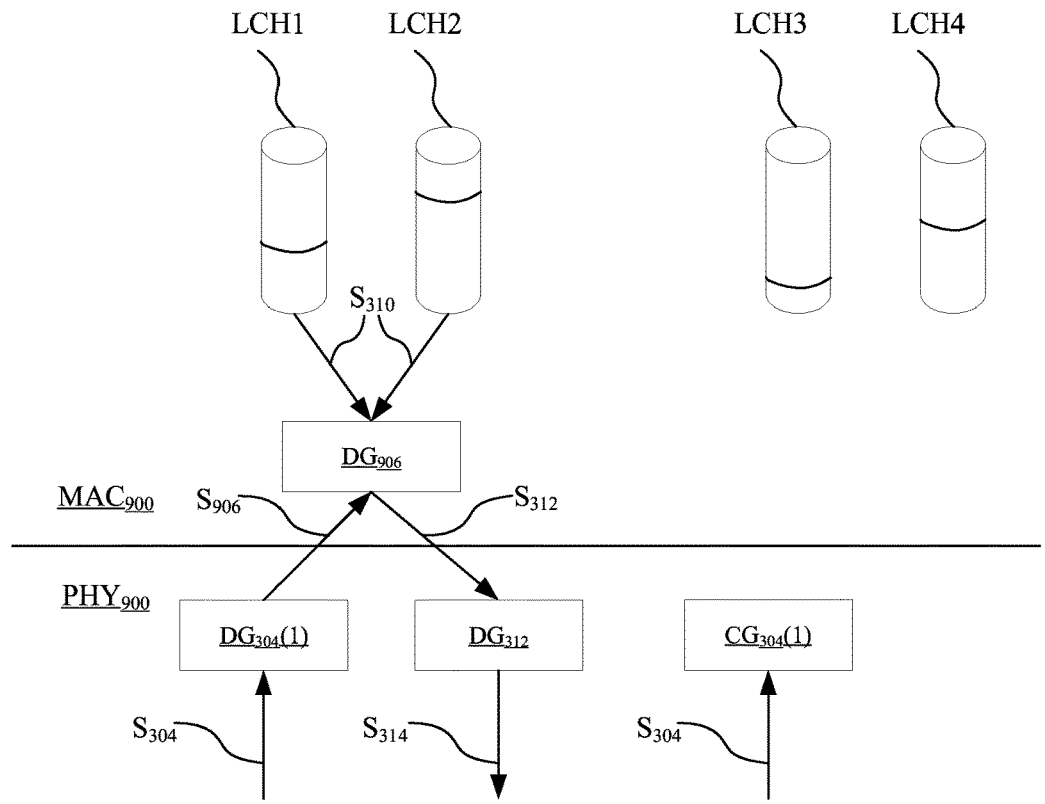
FIG. 12 is a schematic diagram illustrating an example of applying the method in FIG. 9 to an overlapping conflict in time domain between a DG with a high PHY priority and a CG with a high PHY priority.

Referring to FIGS. 9 and 12, FIG. 9 is a flowchart illustrating a method 900 by a UE for PHY-based prioritization without MAC LCH-based prioritization, wherein PHY priority comparison for the PHY-based prioritization is performed by a PHY layer, in accordance with some embodiments of the present disclosure. FIG. 12 is a schematic diagram illustrating an example of applying the method 900 to an overlapping conflict in time domain between a DG with a high PHY priority and a CG with a high PHY priority. The method 900 includes the following steps.

In step 302, MAC LCH-based prioritization is not configured and PHY-based prioritization is configured by a UE. The step 302 has been described with reference to step 302 in FIG. 3 and is omitted here.

In step 304, a first uplink grant and a second uplink grant that have an overlapping conflict in time domain, and have a first PHY priority and a second PHY priority, respectively, is received by a PHY layer of the UE. Illustratively, in the example in FIG. 12, the first uplink grant is a DG with a high PHY priority $DG_{304}(1)$ (i.e., with a priority index of 1 for the first PHY priority). The second uplink grant is a CG with a high PHY priority $CG_{304}(1)$ (i.e., with a priority index of 1 for the second PHY priority). The DG $DG_{304}(1)$ and the CG $CG_{304}(1)$ have an overlapping conflict in time domain, i.e., a PUSCH duration of the DG $DG_{304}(1)$ overlaps a PUSCH duration of the CG $CG_{304}(1)$. In step 304, a PHY layer $PHY_{900}$ of the UE performs a step $S_{304}$ of receiving the DG $DG_{304}(1)$ and the CG $CG_{304}(1)$.

In step 306, whether uplink transmission for the uplink grants is not on-going is determined by the PHY layer. The step 306 has been described with reference to step 306 in FIG. 3 and is omitted here.

Steps 902 to 906 are further included by the method 300 in FIG. 3 between steps 306 and 308. The step 906 is an embodiment of the step 308 in FIG. 3.

In step 902, the first PHY priority is compared with the second PHY priority to obtain a comparison result by the PHY layer. In the example in FIG. 12, in step 902, the PHY layer $PHY_{900}$ compares the first PHY priority of the DG with the high PHY priority $DG_{304}(1)$ and the second PHY priority of the CG with the high PHY priority $CG_{304}(1)$ to obtain that the first PHY priority of the DG $DG_{304}(1)$ is the same as the second PHY priority of the CG $CG_{304}(1)$ as a comparison result.

In step 904, the first one of the uplink grants is selected using the comparison result by the PHY layer. In the example in FIG. 12, in step 904, because the first PHY priority of the DG $DG_{304}(1)$ is the same as the second PHY priority of the CG $CG_{304}(1)$ in the comparison result, according to rule (4) of the PHY-based prioritization in step 302 described with reference to FIG. 3, the PHY layer $PHY_{900}$ selects a predetermined one of the uplink grants which is the DG $DG_{304}(1)$ (i.e., the DG $DG_{304}(1)$ is the first one of the uplink grants).

In step 906, first information is delivered by the PHY layer to a MAC layer of the UE, wherein the first information includes the first one of the uplink grants, but does not include the other one of the uplink grants. As mentioned above, step 906 is an embodiment of the step 308. In this embodiment, the first information implicitly indicates the first PHY priority and the second PHY priority. In the example in FIG. 12, in step 906, the PHY layer $PHY_{900}$ performs a step $S_{906}$ of delivering first information that includes the DG without the first PHY priority $DG_{906}$ but does not include the CG with the second PHY priority $CG_{304}(1)$ or the CG without the second PHY priority $CG_{304}$ to a MAC layer $MAC_{900}$ of the UE. The DG $DG_{906}$ has the same content as the DG $DG_{304}(1)$ except the DG $DG_{906}$ does not have information of the first PHY priority.

In step 310, only the first MAC PDU for the first one of the uplink grants is generated by the MAC layer. In the example in FIG. 12, in step 310, the MAC layer $MAC_{900}$ performs a step $S_{310}$ of encapsulating, on the basis of LCP mapping restrictions, data from an LCH LCH1 and an LCH LCH2 into a first MAC PDU for the DG $DG_{906}$. Because the first information does not include the CG $CG_{304}(1)$ or $CG_{304}$, the step $S_{310}$ further includes not encapsulating, on the basis of LCP mapping restrictions, data from an LCH LCH3 and an LCH LCH4 into a second MAC PDU for the CG $CG_{304}(1)$ or $CG_{304}$. Thus, even when the LCH-based prioritization is not configured in step 302, only the first MAC PDU for the DG $DG_{906}$ is generated. Examples of the LCP mapping restrictions have been described with reference to step 108 in FIG. 1 and are omitted here.

In step 312, the first MAC PDU is delivered by the MAC layer to the PHY layer. In the example in FIG. 12, in step 312, the MAC layer $MAC_{900}$ performs a step $S_{312}$ of delivering the first MAC PDU for the DG $DG_{906}$ to the PHY layer $PHY_{900}$. The DG $DG_{906}$ of which the first MAC PDU is received by the PHY layer $PHY_{900}$ is denoted as $DG_{312}$. Because the second MAC PDU for the CG $CG_{304}(1)$ or $CG_{304}$ is not generated, the second MAC PDU for the CG $CG_{304}(1)$ or $CG_{304}$ is not delivered by the MAC layer $MAC_{900}$ to the PHY layer $PHY_{900}$ compared with the modified existing method 100 that delivers the second MAC PDU for the CG $CG_{106}$ by the MAC layer $MAC_{100}$ to the PHY layer $PHY_{100}$ in step 110 which results in the second MAC PDU for the CG $CG_{110}(0)$ in the PHY layer $PHY_{100}$.

In step 314, the first MAC PDU is uplink transmitted by the PHY layer. In the example in FIG. 12, the PHY layer $PHY_{900}$ performs a step $S_{314}$ of uplink transmitting the first MAC PDU for the DG $DG_{312}$. Because the second MAC PDU for the CG $CG_{304}(1)$ or $CG_{304}$ is not generated, the deficiency of the loss of the second MAC PDU or the inefficiency due to the need for cancellation of the second MAC PDU is improved.

Figure 13:
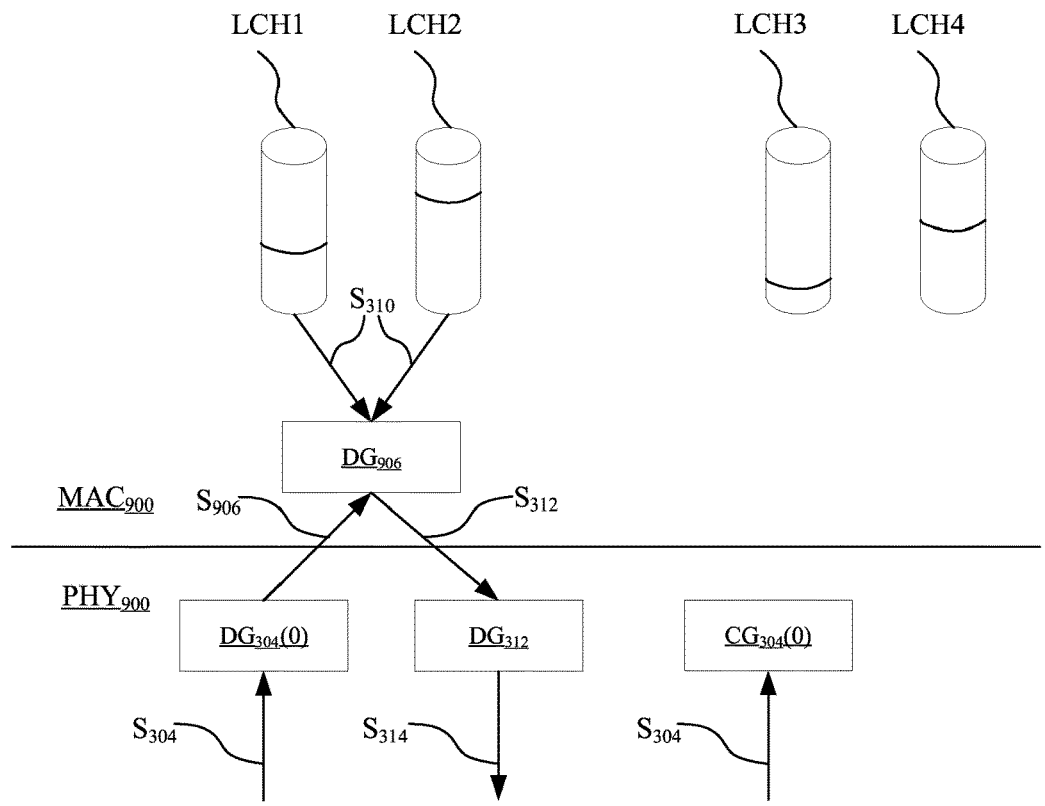
FIG. 13 is a schematic diagram illustrating an example of applying the method in FIG. 9 to an overlapping conflict in time domain between a DG with a low PHY priority and a CG with a low PHY priority.

Referring to FIGS. 9 and 13, FIG. 9 is a flowchart illustrating a method 900 by a UE for PHY-based prioritization without MAC LCH-based prioritization, wherein PHY priority comparison for the PHY-based prioritization is performed by a PHY layer, in accordance with some embodiments of the present disclosure. FIG. 13 is a schematic diagram illustrating an example of applying the method 900 to an overlapping conflict in time domain between a DG with a low PHY priority and a CG with a low PHY priority. The method 900 includes the following steps.

In step 302, MAC LCH-based prioritization is not configured and PHY-based prioritization is configured by a UE. The step 302 has been described with reference to step 302 in FIG. 3 and is omitted here.

In step 304, a first uplink grant and a second uplink grant that have an overlapping conflict in time domain, and have a first PHY priority and a second PHY priority, respectively, is received by a PHY layer of the UE. Illustratively, in the example in FIG. 13, the first uplink grant is a DG with a low PHY priority $DG_{304}(0)$ (i.e., with a priority index of 0 for the first PHY priority). The second uplink grant is a CG with a low PHY priority $CG_{304}(0)$ (i.e., with a priority index of 0 for the second PHY priority). The DG $DG_{304}(0)$ and the CG $CG_{304}(0)$ have an overlapping conflict in time domain, i.e., a PUSCH duration of the DG $DG_{304}(0)$ overlaps a PUSCH duration of the CG $CG_{304}(0)$. In step 304, a PHY layer $PHY_{900}$ of the UE performs a step $S_{304}$ of receiving the DG $DG_{304}(0)$ and the CG $CG_{304}(0)$.

In step 306, whether uplink transmission for the uplink grants is not on-going is determined by the PHY layer. The step 306 has been described with reference to step 306 in FIG. 3 and is omitted here.

Steps 902 to 906 are further included by the method 300 in FIG. 3 between steps 306 and 308. The step 906 is an embodiment of the step 308 in FIG. 3.

In step 902, the first PHY priority is compared with the second PHY priority to obtain a comparison result by the PHY layer. In the example in FIG. 13, in step 902, the PHY layer $PHY_{900}$ compares the first PHY priority of the DG with the low PHY priority $DG_{304}(0)$ and the second PHY priority of the CG with the low PHY priority $CG_{304}(0)$ to obtain that the first PHY priority of the DG $DG_{304}(0)$ is the same as the second PHY priority of the CG $CG_{304}(0)$ as a comparison result.

In step 904, the first one of the uplink grants is selected using the comparison result by the PHY layer. In the example in FIG. 13, in step 904, because the first PHY priority of the DG $DG_{304}(0)$ is the same as the second PHY priority of the CG $CG_{304}(0)$ in the comparison result, according to rule (4) of the PHY-based prioritization in step 302 described with reference to FIG. 3, the PHY layer PHY$_{900}$ selects a predetermined one of the uplink grants which is the DG DG$_{304}$(0) (i.e., the DG DG$_{304}$(0) is the first one of the uplink grants).

In step 906, first information is delivered by the PHY layer to a MAC layer of the UE, wherein the first information includes the first one of the uplink grants, but does not include the other one of the uplink grants. As mentioned above, step 906 is an embodiment of the step 308. In this embodiment, the first information implicitly indicates the first PHY priority and the second PHY priority. In the example in FIG. 13, in step 906, the PHY layer PHY$_{900}$ performs a step S$_{906}$ of delivering first information that includes the DG without the first PHY priority DG$_{906}$ but does not include the CG with the second PHY priority CG$_{304}$(0) or the CG without the second PHY priority CG$_{304}$ to a MAC layer MAC$_{900}$ of the UE. The DG DG$_{906}$ has the same content as the DG DG$_{304}$(0) except the DG DG$_{906}$ does not have information of the first PHY priority.

In step 310, only the first MAC PDU for the first one of the uplink grants is generated by the MAC layer. In the example in FIG. 13, in step 310, the MAC layer MAC$_{900}$ performs a step S$_{310}$ of encapsulating, on the basis of LCP mapping restrictions, data from an LCH LCH1 and an LCH LCH2 into a first MAC PDU for the DG DG$_{906}$. Because the first information does not include the CG CG$_{304}$(0) or CG$_{304}$, the step S$_{310}$ further includes not encapsulating, on the basis of LCP mapping restrictions, data from an LCH LCH3 and an LCH LCH4 into a second MAC PDU for the CG CG$_{304}$(0) or CG$_{304}$. Thus, even when the LCH-based prioritization is not configured in step 302, only the first MAC PDU for the DG DG$_{906}$ is generated. Examples of the LCP mapping restrictions have been described with reference to step 108 in FIG. 1 and are omitted here.

In step 312, the first MAC PDU is delivered by the MAC layer to the PHY layer. In the example in FIG. 13, in step 312, the MAC layer MAC$_{900}$ performs a step S$_{312}$ of delivering the first MAC PDU for the DG DG$_{906}$ to the PHY layer PHY$_{900}$. The DG DG$_{906}$ of which the first MAC PDU is received by the PHY layer PHY$_{900}$ is denoted as DG$_{312}$. Because the second MAC PDU for the CG CG$_{304}$(0) or CG$_{304}$ is not generated, the second MAC PDU for the CG CG$_{304}$(0) or CG$_{304}$ is not delivered by the MAC layer MAC$_{900}$ to the PHY layer PHY$_{900}$ compared with the modified existing method 100 that delivers the second MAC PDU for the CG CG$_{106}$ by the MAC layer MAC$_{100}$ to the PHY layer PHY$_{100}$ in step 110 which results in the second MAC PDU for the CG CG$_{110}$(0) in the PHY layer PHY$_{100}$.

In step 314, the first MAC PDU is uplink transmitted by the PHY layer.

In the example in FIG. 13, the PHY layer PHY$_{900}$ performs a step S$_{314}$ of uplink transmitting the first MAC PDU for the DG DG$_{312}$. Because the second MAC PDU for the CG CG$_{304}$(0) or CG$_{304}$ is not generated, the deficiency of the loss of the second MAC PDU or the inefficiency due to the need for cancellation of the second MAC PDU is improved.

A high PHY priority has a priority index of 1 and a low PHY priority has a priority index of 0 is illustrative. Alternatively, the high PHY priority has a priority index of 0 and a low PHY priority index of 1.

An uplink grant and a PHY priority being integrated together and called an uplink grant with a high or low PHY priority (for example, a DG with a high PHY priority DG(1)) is illustrative. Alternatively, the uplink grant and the PHY priority are separated.

In step 906 in the embodiments described with reference to FIG. 9, the first information including the first one of the uplink grants without the PHY priority is illustrative. Alternatively, the first information further includes the PHY priority of the first one of the uplink grants (e.g., the first information includes the first uplink grants with the PHY priority).

In the above examples, it is assumed that at least one LCH mapped to each of the uplink grants has data and thus, the first information needs to be used for generating only the first MAC PDU for the first one of the uplink grants. In some embodiments, it is possible that every LCH mapped to one of the uplink grants has no data. In this case, on the basis of the method 400 described with reference to FIG. 4, both the uplink grants are delivered by the PHY layer to the MAC layer in the step 402, and thus the MAC layer can select the other one of the uplink grants to which at least one LCH is mapped has data. Depending on implementation, comparison of the PHY priorities in the first information may be performed before or after determination of whether every LCH mapped to one of the uplink grants has no data, and the earlier performed step may prevent execution of the later performed step.

Figure 14:
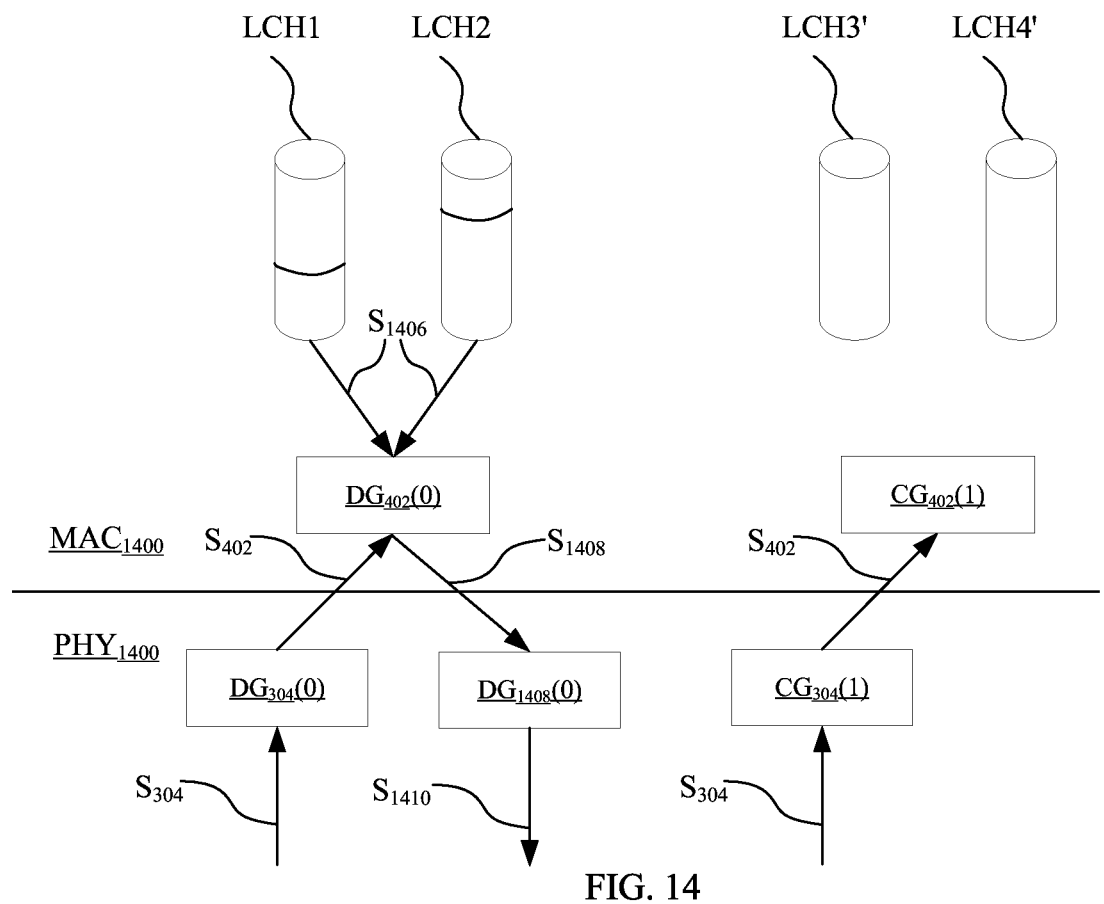
FIG. 14 is a schematic diagram illustrating an example of applying the method in FIG. 4 that is modified so that comparison of PHY priorities in first information is performed before determination of whether every LCH mapped to one of the uplink grants has no data.

Referring to FIG. 14, FIG. 14 is a schematic diagram illustrating an example of applying the method 400 that is modified so that comparison of PHY priorities in first information is performed before determination of whether every LCH mapped to one of the uplink grants has no data (hereafter referred to as a method 400'). In the example in FIG. 14, the method 400' is applied to an overlapping conflict in time domain between a DG with a low PHY priority and a CG with a high PHY priority, and every LCH mapped to the CG has no data. The method 400' includes the following steps.

In step 302, MAC LCH-based prioritization is not configured and PHY-based prioritization is configured by a UE. The step 302 has been described with reference to step 302 in FIG. 3 and is omitted here.

In step 304, a first uplink grant and a second uplink grant that have an overlapping conflict in time domain, and have a first PHY priority and a second PHY priority, respectively, is received by a PHY layer of the UE. Illustratively, in the example in FIG. 14, the first uplink grant is a DG with a low PHY priority DG$_{304}$(0) (i.e., with a priority index of 0 for the first PHY priority). The second uplink grant is a CG with a high PHY priority CG$_{304}$(1) (i.e., with a priority index of 1 for the second PHY priority). The DG DG$_{304}$(0) and the CG CG$_{304}$(1) have an overlapping conflict in time domain, i.e., a PUSCH duration of the DG DG$_{304}$(0) overlaps a PUSCH duration of the CG CG$_{304}$(1). In step 304, a PHY layer PHY$_{1400}$ of the UE performs a step S$_{304}$ of receiving the DG DG$_{304}$(0) and the CG CG$_{304}$(1).

In step 306, whether uplink transmission for the uplink grants is not on-going is determined by the PHY layer. The step 306 has been described with reference to step 306 in FIG. 3 and is omitted here.

In step 402, first information is delivered by the PHY layer to a MAC layer of the UE, wherein the first information includes the first uplink grant and the second uplink grant, and the first PHY priority and the second PHY priority. Step 402 is an embodiment of the step 308. In this embodiment, the first information explicitly indicates the first PHY priority and the second PHY priority. In the example in FIG. 14, in step 402, the PHY layer PHY$_{1400}$ performs a step S$_{402}$ of delivering first information that includes the DG with the low PHY priority DG$_{304}$(0) and the CG with the high PHY priority CG$_{304}$(1) to a MAC layer MAC$_{1400}$ of the UE. The DG with the low PHY priority in the MAC layer MAC$_{1400}$ has the same content as the DG with the low PHY priority $DG_{304}(0)$ in the PHY layer $PHY_{1400}$ and is denoted as $DG_{402}(0)$. The CG with the high PHY priority in the MAC layer $MAC_{1400}$ has the same content as the CG with the high PHY priority $CG_{304}(1)$ is denoted as $CG_{402}(1)$.

In step 404, the first PHY priority is compared with the second PHY priority to obtain a comparison result by the MAC layer. In the example in FIG. 14, in step 404, the MAC layer $MAC_{1400}$ compares the first PHY priority of the DG with the low PHY priority $DG_{402}(0)$ and the second PHY priority of the CG with the high PHY priority $CG_{402}(1)$ to obtain that the second PHY priority of the CG $CG_{402}(1)$ is higher than the first PHY priority of the DG $DG_{402}(0)$ as a comparison result.

In step 1402, whether every LCH mapped to one of the uplink grants has no data is determined by the MAC layer, wherein the one of the uplink grants is a CG with a higher PHY priority in the comparison result. In the example in FIG. 14, in step 1402, because it is the CG $CG_{402}(1)$ that has the higher PHY priority, whether every LCH LCH3' or LCH4' mapped to the CG $CG_{402}(1)$ has no data needs to be determined. In the example in FIG. 14, a result of this determination is true. Thus, step 1404 is performed.

In step 1404, the other one of the uplink grants is selected. In the example in FIG. 14, in step 1404, because both of the grants (the $DG_{304}(0)$ and the $CG_{304}(1)$) are delivered to the MAC layer $MAC_{1400}$ in step 402, the other one of the uplink grants (the $DG_{304}(0)$) can be selected. Further, because the other one of the uplink grants is the DG $DG_{402}(0)$ that is requested because of data awaiting transmission, the MAC layer $MAC_{1400}$ selects the DG $DG_{402}(0)$.

In step 1406, only a third MAC PDU is generated for the other one of the uplink grants by the MAC layer. In the example in FIG. 14, in step 1406, the MAC layer $MAC_{1400}$ performs a step $S_{1406}$ of encapsulating, on the basis of LCP mapping restrictions, data from an LCH LCH1 and an LCH LCH2 into only a third MAC PDU for the DG $DG_{402}(0)$.

In step 1408, the third MAC PDU is delivered by the MAC layer to the PHY layer. In the example in FIG. 14, in step 1408, the MAC layer $MAC_{1400}$ performs a step $S_{1408}$ of delivering the third MAC PDU for the DG $DG_{1408}(0)$ to the PHY layer $PHY_{1400}$. The DG $DG_{1408}(0)$ of which the third MAC PDU is received by the PHY layer $PHY_{1400}$ is denoted as $DG_{1408}(0)$.

In step 1410, the third MAC PDU is uplink transmitted by the PHY layer. In the example in FIG. 14, the PHY layer $PHY_{1400}$ performs a step $S_{1410}$ of uplink transmitting the third MAC PDU for the DG $DG_{1408}(0)$.

In the above example, the CG has the high PHY priority and the DG has the low PHY priority. For other situations such as a DG having a high PHY priority and a CG having a low PHY priority, or PHY priorities of a DG and a CG being the same, because the comparison of the PHY priorities itself is enough to cause the DG to be selected, determination of whether every LCH mapped to one of the uplink grants has no data need not to be performed.

In the above embodiment, comparison of the PHY priorities in the first information is performed before determination of whether every LCH mapped to the one of the uplink grants has no data. Alternatively, comparison of the PHY priorities in the first information is performed after determination of whether every LCH mapped to one of the uplink grants has no data. In this case, in step 1402', whether every LCH mapped to one of the uplink grants has no data is determined by the MAC layer, wherein the one of the uplink grants is a CG. If so, step 404 of comparing the first PHY priority with the second PHY priority to obtain a comparison result is not performed. The step 1404 is directly performed after the step 1402'. If not, step 404 and subsequent steps in the method 400 described with reference to FIG. 4 are performed.

Because the RAN node does not know whether there is data for at least one LCH mapped to the $CG_{304}(1)$, the RAN node may have no idea the third MAC PDU corresponds which of the uplink grants (the $DG_{304}(0)$ and the $CG_{304}(1)$), and decodes the third MAC PDU in a trial-and-error manner. To resolve this inefficiency, in some embodiments, an uplink indication channel that indicates a type of the uplink grant corresponding to the third MAC PDU is further uplink transmitted by the PHY layer along with the third MAC PDU.

Figure 15:
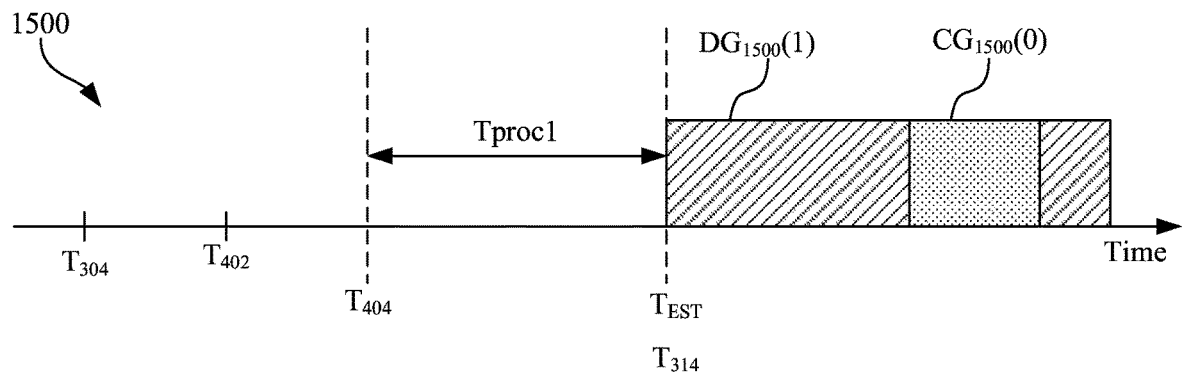
FIG. 15 is a schematic timeline diagram illustrating the latest time for performing a step of comparing the first PHY priority (e.g., a high PHY priority of a DG) with the second PHY priority (e.g., a low PHY priority of a CG) by the MAC layer in the method in FIG. 4 in accordance with some embodiments of the present disclosure.

Referring to FIG. 15, FIG. 15 is a schematic timeline diagram illustrating the latest time for performing a step of comparing the first PHY priority (e.g., a high PHY priority of a DG) with the second PHY priority (e.g., a low PHY priority of a CG) by the MAC layer in the method 400 in FIG. 4 in accordance with some embodiments of the present disclosure.

As illustrated in FIG. 15, at time $T_{304}$, step 304 is performed. In the example in FIG. 15, the first uplink grant is a DG with a high PHY priority $DG_{1500}(1)$ (i.e., with a priority index of 1 for the first PHY priority) and the second uplink grant is a CG with a low PHY priority $CG_{1500}(0)$ (i.e., with a priority index of 0 for the second PHY priority). When the DG $DG_{1500}(1)$ and the CG $CG_{1500}(0)$ is received at time $T_{304}$, it is also known that the DG $DG_{1500}(1)$ has an earlier one of scheduled transmission time $T_{EST}$ of the uplink grants (the DG $DG_{1500}(1)$ and the CG $CG_{1500}(0)$).

Then, at time $T_{402}$, step 402 is performed. Then, at time $T_{404}$, step 404 is performed. The latest time for performing the step 404 is a first period of time Tproc1 before the earlier one of scheduled transmission time $T_ES_T$ of the uplink grants (the DG $DG_{1500}(1)$ and the CG $CG_{1500}(0)$). Because step 404 is performed by the MAC layer and relies on the first information delivered by the PHY layer to the MAC layer, the first period of time Tproc1 does not include time for performing step 402. The first period of time Tproc1 includes time for performing steps 404, 406, 408, and 312. The first period of time Tproc1 further includes time for preparing to perform the step 314 in the PHY layer.

Then, at time $T_{314}$, step 314 of uplink transmitting the first MAC PDU for the DG $DG_{1500}(1)$ is performed. Time $T_{314}$ is the same as the earlier one of scheduled transmission time $T_{EST}$.

Figure 16:
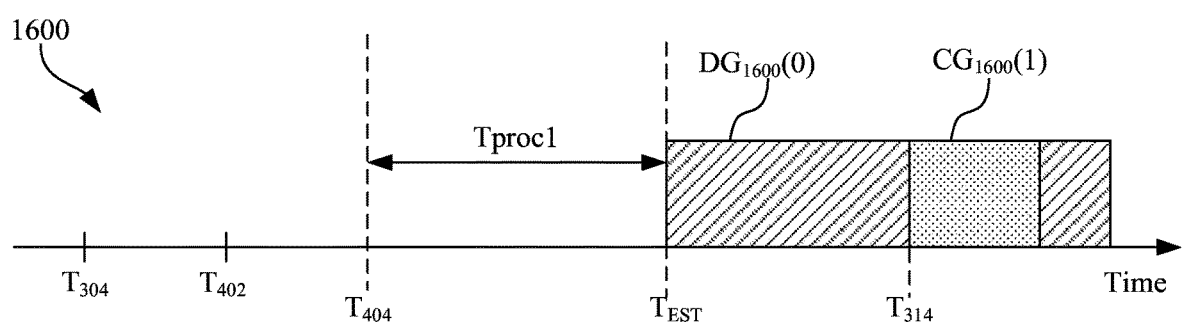
FIG. 16 is a schematic timeline diagram illustrating the latest time for performing a step of comparing the first PHY priority (e.g., a low PHY priority of a DG) with the second PHY priority (e.g., a high PHY priority of a CG) by the MAC layer in the method in FIG. 4 in accordance with some embodiments of the present disclosure.

Referring to FIG. 16, FIG. 16 is a schematic timeline diagram illustrating the latest time for performing a step of comparing the first PHY priority (e.g., a low PHY priority of a DG) with the second PHY priority (e.g., a high PHY priority of a CG) by the MAC layer in the method 400 in FIG. 4 in accordance with some embodiments of the present disclosure.

The example in FIG. 16 illustrates that for the first uplink grant being a DG with a low PHY priority $DG_{1600}(0)$ and the second uplink grant being a CG with a high PHY priority $CG_{1600}(1)$, even though in step 314, it is the CG $CG_{1600}(1)$ that is transmitted, the latest time for performing the step 404 is still a first period of time Tproc1 before an earlier one of scheduled transmission time $T_ES_T$ of the uplink grants (the DG $DG_{1600}(0)$ and the CG $CG_{1600}(1)$). The earlier one of scheduled transmission time $T_{EST}$ is scheduled transmission time for the DG $DG_{1600}(0)$. Time $T_{314}$ at which step 314 is performed is later than the earlier one of scheduled transmission time $T_{EST}$.

Figure 17:
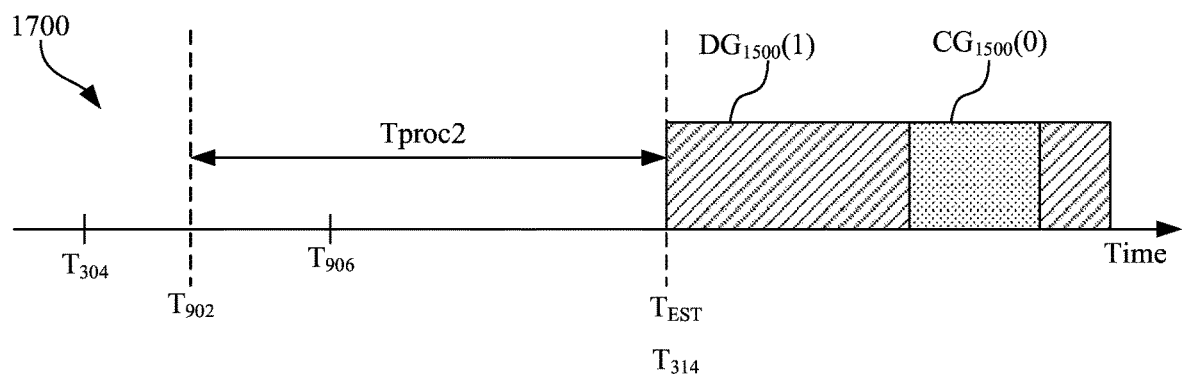
FIG. 17 is a schematic timeline diagram illustrating the latest time for performing a step of comparing the first PHY priority (e.g., a high PHY priority of a DG) with the second PHY priority (e.g., a low PHY priority of a CG) by the PHY layer in the method in FIG. 9 in accordance with some embodiments of the present disclosure.

Referring to FIG. 17, FIG. 17 is a schematic timeline diagram illustrating the latest time for performing a step of comparing the first PHY priority (e.g., a high PHY priority of a DG) with the second PHY priority (e.g., a low PHY priority of a CG) by the PHY layer in the method 900 in FIG. 9 in accordance with some embodiments of the present disclosure.

As illustrated in FIG. 17, at time $T_{304}$, step 304 is performed. In the example in FIG. 17, the first uplink grant is a DG with a high PHY priority $DG_{1500}(1)$ (i.e., with a priority index of 1 for the first PHY priority) and the second uplink grant is a CG with a low PHY priority $CG_{1500}(0)$ (i.e., with a priority index of 0 for the second PHY priority). When the DG $DG_{1500}(1)$ and the CG $CG_{1500}(0)$ is received at time $T_{304}$, it is also known that the DG $DG_{1500}(1)$ has an earlier one of scheduled transmission time $T_{EST}$ of the uplink grants (the DG $DG_{1500}(1)$ and the CG $CG_{1500}(0)$).

Then, at time $T_{902}$, step 902 is performed. Then, at time $T_{906}$, step 906 is performed. The latest time for performing the step 902 is a second period of time Tproc2 before the earlier one of scheduled transmission time $T_{EST}$ of the uplink grants (the DG $DG_{1500}(1)$ and the CG $CG_{1500}(0)$). Because step 902 is performed by the PHY layer and results in the first information delivered by the PHY layer to the MAC layer, the second period of time Tproc2 includes time for performing step 906. The second period of time Tproc2 includes time for performing steps 902, 904, 906, 310, and 312. The second period of time Tproc2 further includes time for preparing to perform the step 314 in the PHY layer.

Then, at time $T_{314}$, step 314 of uplink transmitting the first MAC PDU for the DG $DG_{1500}(1)$ is performed. Time $T_{314}$ is the same as the earlier one of scheduled transmission time $T_{EST}$.

Figure 18:
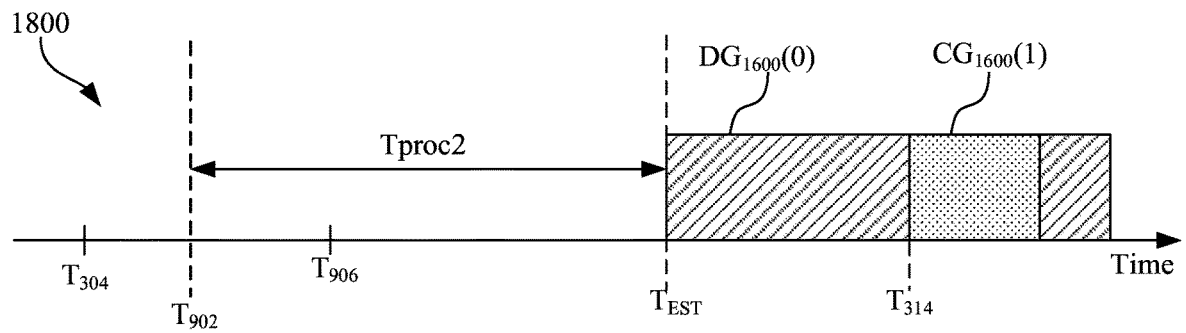
FIG. 18 is a schematic timeline diagram illustrating the latest time for performing a step of comparing the first PHY priority (e.g., a low PHY priority of a DG) with the second PHY priority (e.g., a high PHY priority of a CG) by the PHY layer in the method in FIG. 9 in accordance with some embodiments of the present disclosure.

Referring to FIG. 18, FIG. 18 is a schematic timeline diagram illustrating the latest time for performing a step of comparing the first PHY priority (e.g., a low PHY priority of a DG) with the second PHY priority (e.g., a high PHY priority of a CG) by the PHY layer in the method 900 in FIG. 9 in accordance with some embodiments of the present disclosure.

The example in FIG. 18 illustrates that for the first uplink grant being a DG with a low PHY priority $DG_{1600}(0)$ and the second uplink grant being a CG with a high PHY priority $CG_{1600}(1)$, even though in step 314, it is the CG $CG_{1600}(1)$ that is transmitted, the latest time for performing the step 902 is still a second period of time Tproc2 before an earlier one of scheduled transmission time $T_{EST}$ of the uplink grants (the DG $DG_{1600}(0)$ and the CG $CG_{1600}(1)$). The earlier one of scheduled transmission time $T_{EST}$ is scheduled transmission time for the DG $DG_{1600}(0)$. Time $T_{314}$ at which step 314 is performed is later than the earlier one of scheduled transmission time $T_{EST}$.

In the above examples, the number of bits of each of the PHY priorities is one bit (i.e., the priority index of each of the PHY priorities can be 0 or 1). Because there are, for example, sixteen possible levels for any LCH priority used by the LCH-based prioritization, and there are two possible levels for any PHY priority used by the PHY-based prioritization, the number of levels of any PHY priority is not sufficient for some priority differences between the LCHs to be differentiated. In some embodiments, the number of bits of each of the PHY priorities is increased to two the number of bits of any LCH priority used by the LCH-based prioritization. Thus, for both the method 400 in FIG. 4 and the method 900 in FIG. 9, the comparison result (in step 404 or 902) has higher precision.

Referring to FIG. 19, FIG. 19 is a schematic table diagram illustrating a PHY priority-to-LCH priority mapping 1900, wherein the mapping 1900 is one-to-one, in accordance with some embodiments of the present disclosure. As illustrated in FIG. 19, the number of bits of each of the PHY priorities is the same as the number of bits of any LCH priority used by the LCH-based prioritization, and thus the PHY priority-to-LCH priority mapping 1900 is one-to-one. The number of bits of each of the PHY priorities is exemplarily four and thus there are sixteen possible levels for each of the PHY priorities which correspond to sixteen possible levels for any LCH priority used by the LCH-based prioritization, respectively. Thus, for both the method 400 in FIG. 4 and the method 900 in FIG. 9, the comparison result (in step 404 or 902) has the highest precision.

Even when the number of bits of each of the PHY priorities is increased to two, the increased number of possible levels of each of the PHY priorities are sufficient for an LCH priority (e.g., the highest LCH priority) for control information of a first service, an LCH priority (e.g., the highest LCH priority) for data of the first service, an LCH priority (e.g., the highest LCH priority) for control information of a second service, and an LCH priority (e.g., the highest LCH priority) for data of the second service to be differentiable. The first service and the second service are simultaneously provided by the UE and would have a high PHY priority and a low PHY priority, respectively, if the number of bits of each PHY priorities had been one bit.

For example, the first service is an ultra-reliable low latency communications (URLLC) service. The second service is a web-browsing service. Assuming that control information of the URLLC service is served by a first DG, data of the URLLC service is served by a CG, control information of the web-browsing service is served by a third DG, data of the web-browsing service is served by a fourth DG, because the number of bits of each of the PHY priorities is two, PHY priorities of the first DG, the CG, the third DG, and the fourth DG, respectively, are in a descending order. Thus, the PHY priorities of the first DG, the CG, the third DG, and the fourth DG, respectively, one-to-one correspond to LCH priorities of the control information of the URLLC service, the data of the URLLC service, the control information of the web-browsing service, and the data of the web-browsing service, respectively.

In the embodiments above, the PHY-based prioritization is configured and the LCH-based prioritization is not configured. In order to further enhance UE capability versatility, another case that PHY-based prioritization is not configured and LCH-based prioritization is configured is also proposed to be allowed. Such configuration is also agreed upon in the RAN2#109bis-e meeting.

When the existing method is modified in such a way that PHY-based prioritization is not configured and LCH-based prioritization is configured in situations that PHY-based prioritization is originally used to resolve the overlapping conflict, a RAN node may have no idea a MAC PDU uplink transmitted to the RAN node corresponds to which of the two uplink grants (a DG and a CG), as illustrated by the following steps.

In a first step, LCH-based prioritization is configured and the PHY-based prioritization is not configured by a UE.

In a second step, a first uplink grant and a second uplink grant that have an overlapping conflict in time domain is received by a PHY layer of the UE. The first uplink grant is a DG. The second uplink grant is a CG.

In a third step, the uplink grants are delivered by the PHY layer to a MAC layer of the UE.

In a fourth step, only a fourth MAC PDU is generated for one of the uplink grants on the basis of LCP mapping restrictions and LCH-based prioritization. The MAC layer may encapsulate, on the basis of the LCP mapping restrictions, data from corresponding LCHs into two virtual MAC PDUs for the two uplink grants, respectively, assuming that LCH(s) corresponding to the CG has data available. The MAC layer selects one of the two virtual MAC PDUs on the basis of LCH-based prioritization. Then, the fourth MAC PDU which is real is generated for the selected one of the two virtual MAC PDUs. For the other one of the two virtual MAC PDUs, data is not taken out from the corresponding LCH(s) to form a real MAC PDU.

In a fifth step, the fourth MAC PDU is delivered by the MAC layer to the PHY layer.

In a sixth step, the fourth MAC PDU is uplink transmitted by the PHY layer.

When the RAN node receives the fourth MAC PDU from the UE, because the RAN node may have no idea the uplink grant corresponding to the fourth MAD PDU is not selected on the basis of the PHY priorities of the uplink grants, the RAN node may estimate a priority of each of the uplink grants for the fourth MAC PDU in a trial and error manner. On the basis of the priority of each of the uplink grants, the uplink grant corresponding to the fourth MAC PDU is determined.

To resolve inefficiency of trial and error, in some embodiments, an uplink indication channel that indicates a type of the uplink grant corresponding to the fourth MAC PDU is further uplink transmitted by the PHY layer along with the fourth MAC PDU.

Figure 20:
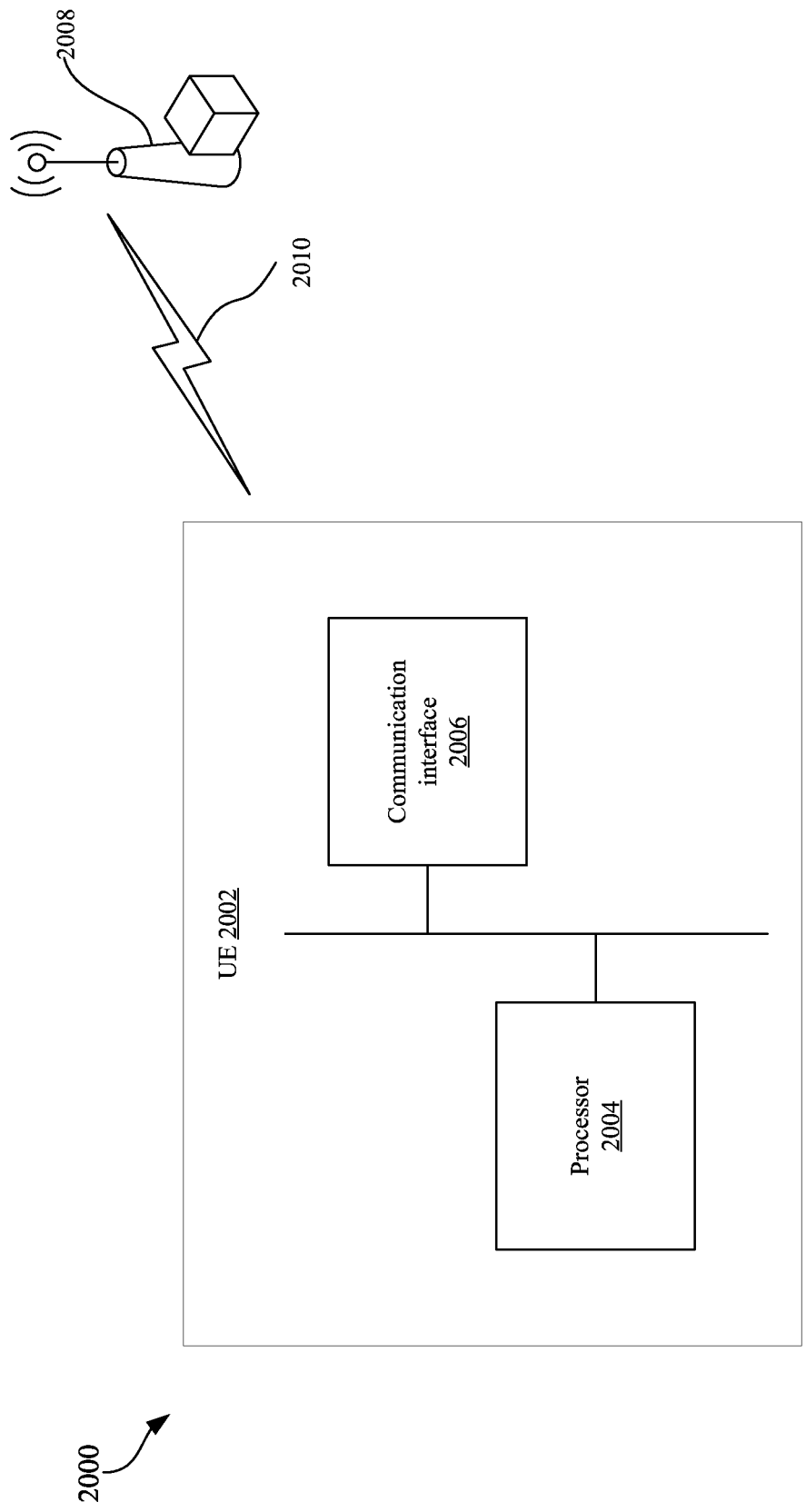
FIG. 20 is a schematic diagram of a system including a UE that is capable of PHY-based prioritization without LCH-based prioritization and/or LCH-based prioritization without PHY-based prioritization in accordance with some embodiments of the present disclosure.

Referring to FIG. 20, FIG. 20 is a schematic diagram of a system 2000 including a UE 2002 that is capable of PHY-based prioritization without LCH-based prioritization and/or LCH-based prioritization without PHY-based prioritization in accordance with some embodiments of the present disclosure. The system 2000 includes a UE 2002 and a RAN node 2008. In some embodiments, the UE 2002 is a higher-tier device that targets increased throughput, increased processing capability and high-power computation. The higher-tier device is, for example, a mobile phone, a tablet, or a subscriber station for factory applications. In other embodiments, the UE 2002 is a lower-tier device or a mid-tier device that is suitable for applications that may not require the increased throughput, the increased processing capability, and the high-power computation for the higher-tier device. The lower-tier device or the mid-tier device is a wearable device, or a sensor. The RAN node 2008 is, for example, a next generation NodeB (gNB), a next generation evolved NodeB (ng-eNB), or a gateway station for factory applications.

In some embodiments, the UE 2002 includes at least one processor 2004 and a communication interface 2006, wherein the at least one processor 2004 are connected to the communication interface 2006.

Embodiments described herein may be implemented into the UE 2002 in the system 2000 using any suitably configured hardware and/or software. The at least one processor 2004 is configured to execute instructions to implement any of the methods in accordance with the embodiments described above to be performed.

The at least one processor 2004 may be implemented as a "processing system." Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), application-specific integrated circuits (ASICs), programmable logic devices (PLDs), state machines, gated logic, discrete hardware circuits, and other suitable hardware configured to perform the various functionality described throughout this disclosure. At least one processor in the processing system may execute software.

The functions implemented in software may be stored on or encoded as one or more instructions or code on a computer-readable medium. Computer-readable media includes computer storage media, which may also be referred to as a non-transitory computer-readable medium. The term non-transitory computer-readable medium excludes transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The communication interface 2006 is configured to engage in communication with a communication interface of the RAN node 2008 via a communication path that includes at least one wireless link 2010.

The RAN node 2008 is configured to configure the PHY priorities, schedule the uplink grants, and receive and decode the uplink MAC PDU for any of the methods in accordance with the embodiments described above to be performed by the UE 2002.

What is claimed is:

1. A method performed by a user equipment (UE), comprising:

when media access control (MAC) logical channel-based prioritization (LCH-based prioritization) is not configured, and physical layer-based prioritization (PHY-based prioritization) is configured in the UE, receiving, by a PHY layer of the UE, a first uplink grant and a second uplink grant that have an overlapping conflict in time domain, and have a first PHY priority and a second PHY priority, respectively; and when uplink transmission for the uplink grants is not on-going, delivering, by the PHY layer, first information to a MAC layer of the UE, wherein the first information is for resolving the overlapping conflict by comparing the first PHY priority with the second PHY priority; and generating, by the MAC layer, only a first MAC protocol data unit (PDU) for a first one of the uplink grants using the first information;

wherein the first information comprises the first uplink grant and the second uplink grant, and the first PHY priority and the second PHY priority; and wherein the step of generating, by the MAC layer of the UE, only the first MAC PDU for the first one of uplink grants using the first information comprises:

comparing, by the MAC layer, the first PHY priority with the second PHY priority to obtain a comparison result;

selecting, by the MAC layer, the first one of the uplink grants using the comparison result; and generating, by the MAC layer, only the first MAC PDU for the first one of the uplink grants.

2. The method of Claim 1, wherein the step of generating, by the MAC layer of the UE, only the first MAC PDU for the first one of the uplink grants using the first information is performed when at least one corresponding logical channel mapped to each of the uplink grants has data.

3. The method of claim 2, wherein the method further comprises:
when every logical channel mapped to one of the uplink grants has no data, selecting, by the MAC layer, the other one of the uplink grants; and
generating, by the MAC layer, only a second MAC PDU for the other one of the uplink grants.

4. The method of claim 1,
wherein the first information comprises the first one of the uplink grants but does not comprise the other one of the uplink grants;
wherein when uplink transmission for the uplink grants is not on-going, before the step of delivering, the method further comprises:
comparing, by the PHY layer, the first PHY priority with the second PHY priority to obtain a comparison result; and
selecting, by the PHY layer, the first one of the uplink grants using the comparison result.

5. The method of claim 1,
wherein the latest time for performing the step of comparing the first PHY priority with the second priority by the MAC layer is a first period of time before an earlier one of scheduled transmission time of the uplink grants;
wherein the first period of time does not include time for performing the step of delivering and includes time for performing the step of generating; or
wherein the latest time for performing the step of comparing the first PHY priority with the second priority by the PHY layer is a second period of time before an earlier one of scheduled transmission time of the uplink grants;
wherein the second period of time comprises time for performing the step of delivering and time for performing the step of generating.

6. The method of claim 1, wherein the number of bits of each of the PHY priorities is more than one bit and fewer than or the same as the number of bits of a logical channel priority used by the MAC LCH-based prioritization.

7. The method of claim 1,
wherein when one of the PHY priorities is higher than the other of the PHY priorities, the first one of the uplink grants is one of the uplink grants having the one of the PHY priorities; and/or
wherein when the PHY priorities are same, the first one of the uplink grants is a predetermined one of the uplink grants.

8. A user equipment (UE), comprising:
at least one processor and a communication interface,
wherein the at least one processor is connected to the communication interface; and
wherein the at least one processor is configured to execute instructions to implement steps comprising:
when media access control (MAC) logical channel-based prioritization (LCH-based prioritization) is not configured, and physical layer-based prioritization (PHY-based prioritization) is configured in the UE, receiving, by a PHY layer of the UE, a first uplink grant and a second uplink grant that have an overlapping conflict in time domain, and have a first PHY priority and a second PHY priority, respectively; and
when uplink transmission for the uplink grants is not on-going,
delivering, by the PHY layer, first information to a MAC layer of the UE, wherein the first information is for resolving the overlapping conflict by comparing the first PHY priority with the second PHY priority; and
generating, by the MAC layer, only a first MAC protocol data unit (PDU) for a first one of the uplink grants using the first information;
wherein the first information comprises the first uplink grant and the second uplink grant, and the first PHY priority and the second PHY priority; and
wherein the step of generating, by the MAC layer of the UE, only the first MAC PDU for the first one of uplink grants using the first information comprises:
comparing, by the MAC layer, the first PHY priority with the second PHY priority to obtain a comparison result;
selecting, by the MAC layer, the first one of the uplink grants using the comparison result; and
generating, by the MAC layer, only the first MAC PDU for the first one of the uplink grants.

9. The UE of Claim 8, wherein the step of generating, by the MAC layer of the UE, only the first MAC PDU for the first one of the uplink grants using the first information is performed when at least one corresponding logical channel mapped to each of the uplink grants has data.

10. The UE of claim 9,
wherein the method further comprises:
when every logical channel mapped to one of the uplink grants has no data, selecting, by the MAC layer, the other one of the uplink grants; and
generating, by the MAC layer, only a second MAC PDU for the other one of the uplink grants.

11. The UE of claim 8,
wherein the first information comprises the first one of the uplink grants but does not comprise the other one of the uplink grants;
wherein when uplink transmission for the uplink grants is not on-going, before the step of delivering, the method further comprises:
comparing, by the PHY layer, the first PHY priority with the second PHY priority to obtain a comparison result; and
selecting, by the PHY layer, the first one of the uplink grants using the comparison result.

12. The UE of claim 8,
wherein the latest time for performing the step of comparing the first PHY priority with the second priority by the MAC layer is a first period of time before an earlier one of scheduled transmission time of the uplink grants;
wherein the first period of time does not include time for performing the step of delivering and includes time for performing the step of generating; or
wherein the latest time for performing the step of comparing the first PHY priority with the second priority by the PHY layer is a second period of time before an earlier one of scheduled transmission time of the uplink grants;
wherein the second period of time comprises time for performing the step of delivering and time for performing the step of generating.

13. The UE of claim 8, wherein the number of bits of each of the PHY priorities is more than one bit and fewer than or the same as the number of bits of a logical channel priority used by the MAC LCH-based prioritization.

14. The UE of claim 8,
wherein when one of the PHY priorities is higher than the other of the PHY priorities, the first one of the uplink grants is one of the uplink grants having the one of the PHY priorities; and/or
wherein when the PHY priorities are same, the first one of the uplink grants is a predetermined one of the uplink grants.

15. A non-transitory computer readable medium, having instructions stored therein, wherein the instructions are executable by a processor to perform steps comprising:
when media access control (MAC) logical channel-based prioritization (LCH-based prioritization) is not configured, and physical layer-based prioritization (PHY-based prioritization) is configured in the UE,
receiving, by a PHY layer of the UE, a first uplink grant and a second uplink grant that have an overlapping conflict in time domain, and have a first PHY priority and a second PHY priority, respectively; and
when uplink transmission for the uplink grants is not on-going,
delivering, by the PHY layer, first information to a MAC layer of the UE, wherein the first information is for resolving the overlapping conflict by comparing the first PHY priority with the second PHY priority; and
generating, by the MAC layer, only a first MAC protocol data unit (PDU) for a first one of the uplink grants using the first information;
wherein the first information comprises the first uplink grant and the second uplink grant, and the first PHY priority and the second PHY priority; and
wherein the step of generating, by the MAC layer of the UE, only the first MAC PDU for the first one of uplink grants using the first information comprises:
comparing, by the MAC layer, the first PHY priority with the second PHY priority to obtain a comparison result;
selecting, by the MAC layer, the first one of the uplink grants using the comparison result; and
generating, by the MAC layer, only the first MAC PDU for the first one of the uplink grants.

16. The non-transitory computer readable medium of Claim 15, wherein the step of generating, by the MAC layer of the UE, only the first MAC PDU for the first one of the uplink grants using the first information is performed when at least one corresponding logical channel mapped to each of the uplink grants has data.

17. The non-transitory computer readable medium of claim 16,
wherein the method further comprises:
when every logical channel mapped to one of the uplink grants has no data, selecting, by the MAC layer, the other one of the uplink grants; and
generating, by the MAC layer, only a second MAC PDU for the other one of the uplink grants.

* * * * *